(12) United States Patent
Damnjanovic et al.

(10) Patent No.: US 9,825,745 B2
(45) Date of Patent: *Nov. 21, 2017

(54) COMMON REFERENCE SIGNAL PHASE DISCONTINUITY AND SEQUENCE INITIALIZATION

(71) Applicant: QUALCOMM Incorporated, San Diego, CA (US)

(72) Inventors: Aleksandar Damnjanovic, Del Mar, CA (US); Wanshi Chen, San Diego, CA (US); Peter Gaal, San Diego, CA (US); Durga Prasad Malladi, San Diego, CA (US); Tao Luo, San Diego, CA (US); Yongbin Wei, La Jolla, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,113

(22) Filed: May 20, 2016

(65) Prior Publication Data
US 2016/0269154 A1  Sep. 15, 2016

Related U.S. Application Data

(63) Continuation of application No. 14/162,484, filed on Jan. 23, 2014, now Pat. No. 9,369,252.
(Continued)

(51) Int. Cl.
*H04L 5/00* (2006.01)
*H04W 72/04* (2009.01)
*H04W 56/00* (2009.01)

(52) U.S. Cl.
CPC ............ *H04L 5/005* (2013.01); *H04L 5/0053* (2013.01); *H04W 56/0045* (2013.01); *H04W 72/0406* (2013.01)

(58) Field of Classification Search
None
See application file for complete search history.

(56) References Cited

U.S. PATENT DOCUMENTS

| 5,521,532 A | 5/1996 | Gumm |
| 6,594,303 B1 | 7/2003 | Agrawal et al. |

(Continued)

FOREIGN PATENT DOCUMENTS

| CN | 102484516 A | 5/2012 |
| WO | WO-0042713 A1 | 7/2000 |

(Continued)

OTHER PUBLICATIONS

Anritsu, "Correction to 5.13.3: UE Phase Discontinuity," 3rd Generation Partnership Project (3GPP), 3GPP TSG-RAN5 Meeting #31, R5-061456, May 8-12, 2006, Shanghai, China, 15 pgs.
(Continued)

*Primary Examiner* — Candal Elpenord
(74) *Attorney, Agent, or Firm* — Holland & Hart LLP

(57) ABSTRACT

Methods, systems, and devices are described for supporting common reference signaling in wireless communications systems. Some configurations introduce a phase discontinuity between common reference signal (CRS) transmissions on different subframes. This may address issues that may arise when a reduced CRS periodicity is utilized. Indicators may also be transmitted from base stations to user equipment (UEs) to indicate whether phase continuity may be assumed or not. Some configurations may support CRS sequence initialization. These tools and techniques may utilize an extended CRS sequence periodicity, which may increase the number of CRS sequences transmitted by a cell.

27 Claims, 15 Drawing Sheets

Related U.S. Application Data

(60) Provisional application No. 61/757,008, filed on Jan. 25, 2013.

(56) References Cited

U.S. PATENT DOCUMENTS

| | | | | |
|---|---|---|---|---|
| 7,221,699 | B1* | 5/2007 | Lindskog | H04L 25/0214 370/516 |
| 8,483,304 | B2 | 7/2013 | Imamura et al. | |
| 9,071,488 | B2 | 6/2015 | Yoon et al. | |
| 9,369,252 | B2 | 6/2016 | Damnjanovic et al. | |
| 2002/0060996 | A1 | 5/2002 | Kwak et al. | |
| 2003/0043768 | A1 | 3/2003 | Chang et al. | |
| 2003/0142734 | A1 | 7/2003 | Black et al. | |
| 2003/0157898 | A1* | 8/2003 | Ylitalo | H04B 7/005 455/67.15 |
| 2003/0198201 | A1* | 10/2003 | Ylitalo | H04B 7/005 370/329 |
| 2007/0064669 | A1 | 3/2007 | Classon et al. | |
| 2008/0063012 | A1 | 3/2008 | Nakao et al. | |
| 2008/0137633 | A1* | 6/2008 | Okamoto | H04B 1/707 370/342 |
| 2009/0238290 | A1* | 9/2009 | Imai | H04B 7/0613 375/260 |
| 2010/0002617 | A1 | 1/2010 | Seyama | |
| 2012/0020236 | A1 | 1/2012 | Wu | |
| 2012/0176885 | A1 | 7/2012 | Lee et al. | |
| 2012/0252381 | A1 | 10/2012 | Nogami et al. | |
| 2013/0003788 | A1* | 1/2013 | Marinier | H04B 7/024 375/219 |
| 2013/0322376 | A1* | 12/2013 | Marinier | H04W 72/06 370/329 |

FOREIGN PATENT DOCUMENTS

| | | |
|---|---|---|
| WO | WO-2010087214 A1 | 8/2010 |
| WO | WO-2010116881 A1 | 10/2010 |
| WO | WO-2010122869 A1 | 10/2010 |

OTHER PUBLICATIONS

ISA/EPO, International Search Report and the Written Opinion of the International Searching Authority, Int'l. App. No. PCT/US2014/012852, Apr. 30, 2014, European Patent Office, Rijswijk, NL, 12 pgs.

Nokia Siemens Networks, Nokia, "Evaluation of Receiver Performance in Serving and Non-Serving Cells," 3rd Generation Partnership Project (3GPP) Draft, 3GPP TSG-RAN Working Group 1 #64, R1-111046, Agenda Item 5.2.3—UL TX Div for HSPA, Pilot Channel, Feb. 21-25, 2011, Taipei, TW, 10 pgs.

Nokia, Nokia Siemens Networks, "On RRM Measurements for NCT Aggregated With a Legacy LTE Carrier," 3rd Generation Partnership Project (3GPP) Draft, 3GPP TSG RAN WG1 Meeting #72, R1-130479, Agenda Item 7.3.1.2, Jan. 28-Feb. 1, 2013, St, Julian's, Malta, 2 pgs.

Intel Corporation, "Considerations on New Carrier Type Support," 3GPP TSG-RAN WG2 Meeting #78, R2-122793, Prague, Czech Republic, May 20-25, 2012, 3 pgs., 3rd Generation Partnership Project.

LG Electronics, "Issues on the CM Increase Due to the Repeated DL RS Pattern," 3GPP TSG-RAN WG1 Meeting #55bis, R1-090209, Ljubljana, Slovenia, Jan. 12-16, 2009. 4 pgs,, 3rd Generation Partnership Project.

Qualcomm Incorporated, "Resource Allocation Methods for NCT" 3GPP TSG-RAN WG1 Meeting #69, R1-122771, Prague, CZ, May 21-25, 2012, 2 pgs., 3rd Generation Partnership Project.

Texas Instruments, "Resolving CM and Cell ID Issues Associated with Aggregated Carriers," 3GPP TSG-RAN WG1 Meeting #55bis, R1-090281, Ljubljana, Slovenia, Jan. 12-16, 2009, 2 pgs., 3rd Generation Partnership Project.

* cited by examiner

COMMON REFERENCE SIGNAL PHASE DISCONTINUITY AND SEQUENCE INITIALIZATION

CROSS REFERENCES

The present Application for Patent is a continuation of U.S. patent application Ser. No. 14/162,484 by Damnjanovic et al., entitled "Common Reference Signal Phase Discontinuity and Sequence Initialization," filed Jan. 23, 2014, which claims priority to U.S. Provisional Patent Application No. 61/757,008 by Damnjanovic et al., entitled "Methods, Systems, and Devices for Common Reference Signal Phase Discontinuity and Sequence Initialization," filed Jan. 25, 2013, each of which is assigned to the assignee hereof and expressly incorporated by reference herein.

BACKGROUND

The following relates generally to wireless communication, and more specifically to systems, devices, and methods that utilize common reference signals for a wireless channel for wireless communication systems. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Base stations may transmit common reference signals to mobile devices with specific periods. Different issues may arise when a common reference signal periodicity is reduced.

SUMMARY

The described features generally relate to one or more methods, systems, and devices for supporting common reference signaling in wireless communications systems. For example, in some configurations, a phase discontinuity may be introduced between common reference signal (CRS) transmissions on different subframes. This may address issues that may arise when a reduced CRS periodicity may be utilized. Indicators may also be transmitted from base stations to user equipment (UEs) to indicate whether phase continuity may be assumed or not. Some configurations may support CRS sequence initialization. These tools and techniques may utilize extended CRS sequence periodicity, which may increase the number of CRS sequences transmitted by a cell.

While these tools and techniques may have general applicability to different wireless communications systems, the methods, systems, and devices disclosed may be utilized in particular with New Carrier Type (NCT). For example, NCT may utilize a CRS periodicity that is reduced to one subframe every 5 ms on a single antenna port. As a result, transmission from multiple physical antenna ports on a single virtual antenna port may create received signal nulls and may create CRS coverage holes. Coherent combining across different subframes may also not be useful in some cases, such as with high mobility user equipment (UEs). The use of phase discontinuity between CRS transmissions on different subframes and/or extending a CRS sequence periodicity for CRS sequence initialization may address these issues.

In some embodiments, a method for receiving common reference signals in a wireless communications system is provided. The method may include: determining that a phase continuity may not be assumed between a first common reference signal (CRS) transmission and a second CRS transmission; and/or receiving the first CRS transmission and the second CRS transmission without maintaining the phase continuity.

Determining that the phase continuity may not be assumed between a first CRS transmission and a second CRS transmission may include receiving an indicator that indicates that the phase continuity may not be assumed. The indicator may be received before the first CRS transmission and the second CRS transmission are received. Some configurations include: receiving a third CRS transmission and a fourth CRS transmission that use a continuous CRS phase; and/or receiving an indicator that the phase continuity may be assumed. In some situations, an indicator that a third CRS transmission and a fourth CRS transmission may be coherently combined may be received.

In some configurations, a phase discontinuity may occur between a first frame and a second frame. In other examples, determining that the phase discontinuity may not be assumed between the first CRS transmission and the second CRS transmission may include determining the first CRS transmission and the second CRS transmission occur within a first frame in some cases. The phase discontinuity may include a phase ramp up, or it may include a cycle delay diversity (CDD) that varies a CRS phase in time or in frequency. The method may be implemented in some cases with wireless communications system that uses a New Carrier Type (NCT) with respect to the first CRS transmission and the second CRS transmission.

In some embodiments, a system for receiving common reference signals is provided. The system may include: means for determining that a phase continuity may not be assumed is used between a first common reference signal (CRS) transmission and a second CRS transmission; and/or means for receiving the first CRS transmission and the second CRS transmission without maintaining the phase continuity.

The means for determining that the phase continuity may not be assumed between a first CRS transmission and a second CRS transmission may include means for receiving an indicator that indicates that the phase continuity may not be assumed. In some configurations, the system may include: means for receiving a third CRS transmission and a fourth CRS transmission that use a continuous CRS phase; and/or means for receiving an indicator that the phase continuity may be assumed. The system may include means for receiving an indicator that a third CRS transmission and a fourth CRS transmission may be coherently combined.

In some configurations, the phase discontinuity may occur between a first frame and a second frame. In some embodiments, the means for determining that the phase continuity may not be assumed between the first CRS transmission and the second CRS transmission may include means for determining the first CRS transmission and the second CRS transmission may occur within a first frame. The phase discontinuity may include a phase ramp up, or it may include a cycle delay diversity (CDD) that varies a CRS phase in time or in frequency. The system may use a New Carrier Type (NCT) with respect to the first CRS transmission and the second CRS transmission.

In some embodiments, a computer program product for wireless communications systems is provided that may include a non-transitory computer-readable medium that may include: code for determining that a phase continuity may not be assumed between a first common reference signal (CRS) transmission and a second CRS transmission; and/or code for receiving the first CRS transmission and the second CRS transmission without maintaining the phase continuity.

In some cases, the computer program product includes code for receiving an indicator that the phase continuity may not be assumed. The computer program product may also include code for receiving a third CRS transmission and a fourth CRS transmission that use a continuous CRS phase, and it may include code for receiving an indicator that the phase continuity may be assumed. In still further embodiments, the computer program product may include code for receiving an indicator that the third CRS transmission and the fourth CRS transmission may be coherently combined.

A wireless communications device is provided that may include a processor that may be configured to: determine that a phase continuity may not be assumed between a first common reference signal (CRS) transmission and a second CRS transmission; and/or receive the first CRS transmission and the second CRS transmission without maintaining the phase continuity.

In some embodiments of the wireless communications device, the processor is configured to receive an indicator that the phase continuity may not be assumed. Additionally or alternatively, the processor may be configured to receive a third CRS transmission and a fourth CRS transmission that use a continuous CRS phase; and/or receive an indicator that the phase continuity may be assumed. In some cases, the processor is further configured to receive an indicator that the third CRS transmission and the fourth CRS transmission may be coherently combined. In some embodiments of the wireless communications device, the first CRS transmission and the second CRS transmission occur within a first frame.

The processor of the wireless communications device may be configured to determine that a phase discontinuity is used between a first frame and a second frame. In some instances, the phase discontinuity includes a phase ramp up.

Further scope of the applicability of the described methods, systems, and/or devices will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are provided for supporting common reference signaling in wireless communications systems. For example, in some configurations, a phase discontinuity may be introduced between common reference signal (CRS) transmissions on different subframes. This may address issues that may arise when a reduced CRS periodicity may be utilized. Indicators may also be transmitted from base stations to user equipment (UEs) to indicate whether phase continuity may be assumed or not. Some configurations support CRS sequence initialization. These tools and techniques may utilize extended CRS sequence periodicity, which may increase the number of CRS sequences transmitted by a cell.

While these tools and techniques may have general applicability to different wireless communications systems, the methods, systems, and devices disclosed may be utilized in particular with New Carrier Type (NCT). For example, NCT may utilize a CRS periodicity that is reduced to one subframe every 5 ms on a single antenna port. As a result, transmission from multiple physical antenna ports on a single virtual antenna port may create received signal nulls and may create CRS coverage holes. Coherent combining across different subframes may also not be useful in some cases, such as with high mobility user equipment (UEs). The use of phase discontinuity between CRS transmissions on different subframes and/or extending a CRS sequence periodicity for CRS sequence initialization may address these issues.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
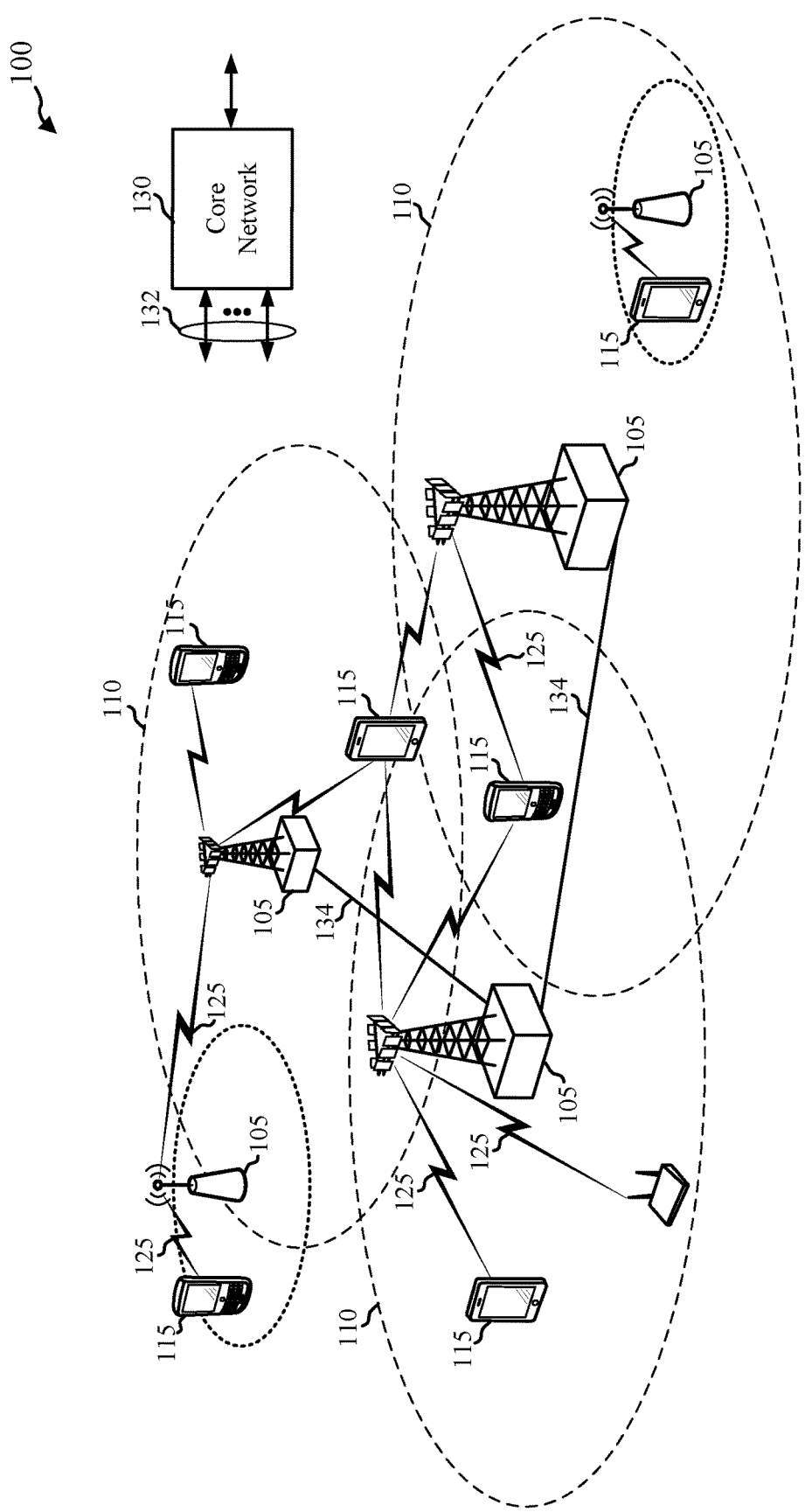
FIG. 1 shows a block diagram of a wireless communications system in accordance with various embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, an evolved NodeB (eNodeB or eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

In some embodiments, the system 100 may be an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells. In some configurations, an eNB 105 may introduce a phase discontinuity between CRS transmissions on different subframes. For example, an eNB 105 may determine a phase discontinuity to use between a first common reference signal (CRS) transmission and a second CRS transmission. The eNB 105 may then transmit the multiple common references signals, such as first CRS transmission and the second CRS transmission without maintaining phase continuity. This may involve utilizing the determined phase discontinuity. In some cases, the eNB 105 may utilize a New Carrier Type (NCT) with respect to the CRS transmissions.

In some configurations, an eNB 105 may be involved with specific forms of CRS sequence initialization. For example, an eNB 105 may determine an extended common reference signal sequence period with respect to an identified reference signal sequence period. In one example, an eNB 105 may extend a CRS sequence period from 10 ms to a higher value, including but not limited to 40 ms or 50 ms. This may be of use, for example, with NCT. The eNB 105 may utilize the extended common reference signal sequence period in a variety of ways.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like. In some configurations, a UE 115 determines that phase continuity may not be assumed between multiple common reference signal (CRS) transmissions, such as a first CRS transmission and a second CRS transmission. In some cases, this may involve determining at the UE 115 that a phase discontinuity is used. The UE 115 may receive multiple CRS transmissions, such as the first CRS transmission and the second CRS transmission, without maintaining the phase continuity. The UE 115 may use a New Carrier Type (NCT) with respect to the CRS transmissions in some configurations. In some cases, common reference signaling may be referred to as cell-specific reference signaling.

In some configurations, a UE 115 may be utilized with respect to CRS sequence initialization. For example, a UE 115 may determine an extended common reference signal sequence period with respect to an identified reference signal sequence period. The UE 115 may utilize the extended common reference signal sequence period in a variety of ways. The UE 115 may use a New Carrier Type (NCT) with respect to the CRS sequence initialization in some configurations.

The transmission links 125 shown in network 100 may include uplink transmissions from a mobile device 115 to a base station 105, and/or downlink transmissions, from a base station 105 to a mobile device 115. The downlink transmissions may also be called forward link transmissions while the uplink transmissions may also be called reverse link transmissions. While the wireless system 100 is described in relation to LTE/LTE-Advanced architectures, those skilled in the art will readily appreciate, the various concepts presented throughout this disclosure may be extended to other types of wireless networks.

Figure 2:
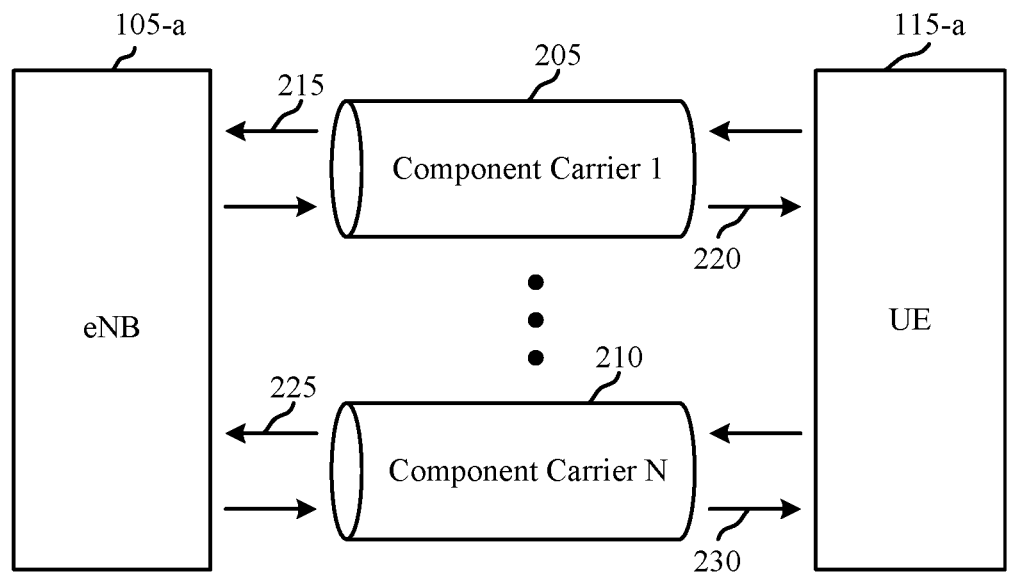
FIG. 2 illustrates a system that can be used in accordance with the various embodiments.

FIG. 2 illustrates a system 200 that can be used in accordance with the disclosed embodiments. The system 200 may include a UE 115-a, which may communicate with an eNB 105-a (e.g., a base station, access point, etc.) using one or more component carriers 1 through N ($CC_1$-$CC_N$). The UE 115-a and eNB 105-a may be examples of the UE 115 and eNB 105 of FIG. 1. While only one user equipment 115-a and one eNB 105-a are illustrated in FIG. 2, it will be appreciated that the system 200 may include any number of UEs 115 and/or eNBs 105.

In one embodiment, the eNB 105-a may transmit information to the UE 115-a over forward (downlink) channels 220 and 230 on component carriers $CC_1$ 205 through $CC_N$ 210. In addition, the UE 115-a may transmit information to the eNB 105-a over reverse (uplink) channels 215 and 225 on component carriers $CC_1$ 205 though $CC_N$ 210. In describing the various entities of FIG. 2, as well as other figures associated with some of the disclosed embodiments, for the purposes of explanation, the nomenclature associated with a 3GPP LTE or LTE-A wireless network is used. However, it is to be appreciated that the system 200 may operate in other networks such as, but not limited to, an OFDMA wireless network, a CDMA network, a 3GPP2 CDMA2000 network and the like.

In LTE-A based systems, the UE 115-a may be configured with multiple component carriers utilized by the eNB 105-a to enable a wider overall transmission bandwidth (e.g., carrier aggregation). As illustrated in FIG. 2, the UE 115-a may be configured with "component carrier 1" 205 through "component carrier N" 210, where N is an integer greater than or equal to one. While FIG. 2 depicts two component carriers, it is to be appreciated that the UE 115-a may be configured with any suitable number of component carriers and, accordingly, the subject matter disclosed herein and the claims are not limited to two component carriers. Component carrier 205 through 210 may include respective downlinks 220 and 230 as well as respective uplinks 215 and 225.

In multi-carrier operations, Downlink Control Information (DCI) messages associated with different UEs may be carried on a plurality of component carriers. For example, the DCI on a PDCCH may be included on the same component carrier that is configured to be used by a UE for PDSCH transmissions (i.e., same-carrier signaling). Alternatively, or additionally, the DCI may be carried on a component carrier different from the target component carrier used for PDSCH transmissions (e.g., cross-carrier signaling). In some embodiments, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

Enhancements to LTE/LTE-A based systems may increase the capacity and coverage of these systems. In addition, the coordination between different cells may also improve as enhancements to LTE/LTE-A based systems are implemented. In one embodiment, small cell enhancements based on carrier aggregation may be implemented to increase the capacity and coverage of a system.

New Carrier Type (NCT) may be introduced to help optimize small cells. NCT may also be used in macro cells. In one configuration, NCT may reduce common reference signal overhead and allow the operation of downlink control channels to be based on demodulation reference signals. For example, in LTE/LTE-A Rel. 12 an NCT is introduced with transmission of cell-specific reference signals being removed in four out of five subframes. This may provide various performance gains for different transmit antenna configurations of eNBs. Reducing the CRS periodicity, however, may result in different issues. Different configurations may address these issues. For example, in some configurations, phase discontinuity between CRS transmissions on different subframes may be introduced. In some cases, indicators transmitted from eNB 105-a to UE 115-a over an NCT may indicate whether phase continuity may be assumed or not. Furthermore, with reduced CRS periodicity, there may be fewer CRS sequences transmitted by a cell. This may impact CRS sequence initialization. Some configurations may address this issue by utilizing an extended CRS sequence periodicity, such that the number of possible sequences per cell may be increased (e.g., from 2 (for 10 ms CRS sequence initialization periodicity) to 8 (for 40 ms CRS sequence initialization periodicity)). Some configurations may also introduce CRS configuration information, such as time and/or frequency mapping, transmission from eNB 105-a to UE 115-a. The CRS configuration information may be dependent upon a system bandwidth.

Figure 3:
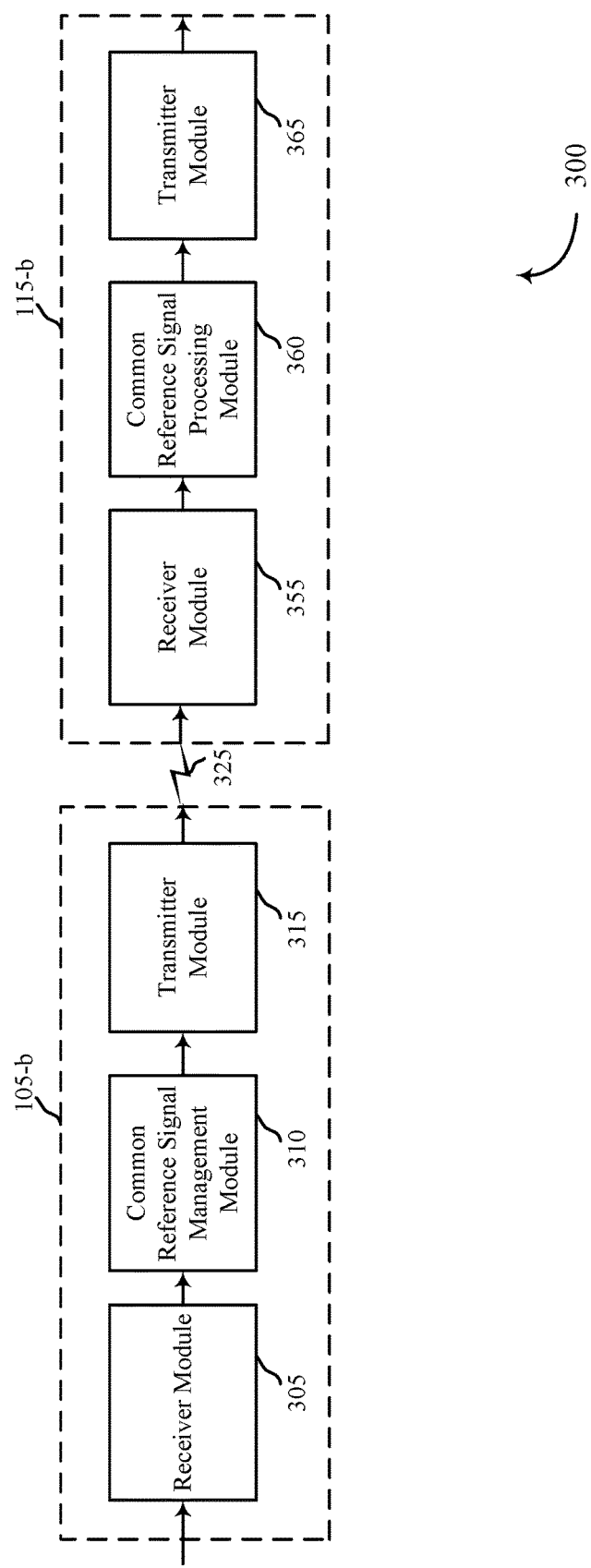
FIG. 3 shows a block diagram of a wireless communications system with a base station and UE in accordance with various embodiments.

FIG. 3 is a block diagram 300 illustrating a wireless communications system 300 in accordance with various configurations. System 300 includes a UE 115-b and a base station 105-b in accordance with various configurations. The UE 115-b may be an example of the UE 115 illustrated in FIGS. 1, 2, and/or 8. The base station 105-b may be an example of the base station illustrated in FIGS. 1, 2, and/or 8. The base station 105-b may include a receiver module 305, a common reference signal management module 310, and/or a transmitter module 315. Each of these components may be in communication with each other; in some cases, these components may be integrated into one or more modules. The UE 115-b may include a receiver module 355, a common reference signal processing module 360, and a transmitter module 365. Each of these components may be in communication with each other; these components may be integrated into one or more modules. The base station 115-b and the UE 115-b may be in wireless communication 325 with each other.

These components of the UE 115-b or the base station 105-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some configurations, the receiver module 355 of UE 115-*b* may include a cellular receiver and may receive transmissions from an base station 105-*b* transmitted from transmitter module 315. The common reference signal (CRS) management module 310 of the base station 105-*b* may manage CRS transmissions that may be transmitted via the transmitter module 315. The CRS processing module 360 of the UE 115-*b* may process CRS transmission that may be received via the receiver module 355.

In some configurations, the CRS management module 310 may introduce a phase discontinuity between CRS transmissions on different subframes. For example, the CRS management module 310 may determine a phase discontinuity to use between a first common reference signal (CRS) transmission and a second CRS transmission. The CRS management module 310 and/or the transmitter module 315 may then transmit the first CRS transmission and the second CRS transmission without maintaining phase continuity. This may involve utilizing the determined phase discontinuity. The UE 115-*b* may utilize the CRS processing module 360 to determine that phase continuity may not be assumed between a first common reference signal (CRS) transmission and a second CRS transmission. In some cases, this may involve determining that a phase discontinuity is used. The CRS processing module 360 and/or the receiver module 355 may receive the first CRS transmission and the second CRS transmission that use the phase discontinuity. The system 300 may use a New Carrier Type (NCT) with respect to the CRS transmissions.

In some configurations, the CRS management module 310 of the base station 105-*b* and/or the CRS processing module 360 of the UE 115-*b* may be utilized with respect to CRS sequence initialization. For example, the CRS management module 310 and/or the CRS processing module 360 may determine an extended common reference signal sequence period with respect to an identified reference signal sequence period. The CRS management module 310 and/or the CRS processing module 360 may utilize the extended common reference signal sequence period in a variety of ways. The wireless communications system 300 may use a New Carrier Type (NCT) with respect to the CRS sequence initialization.

Figure 4:
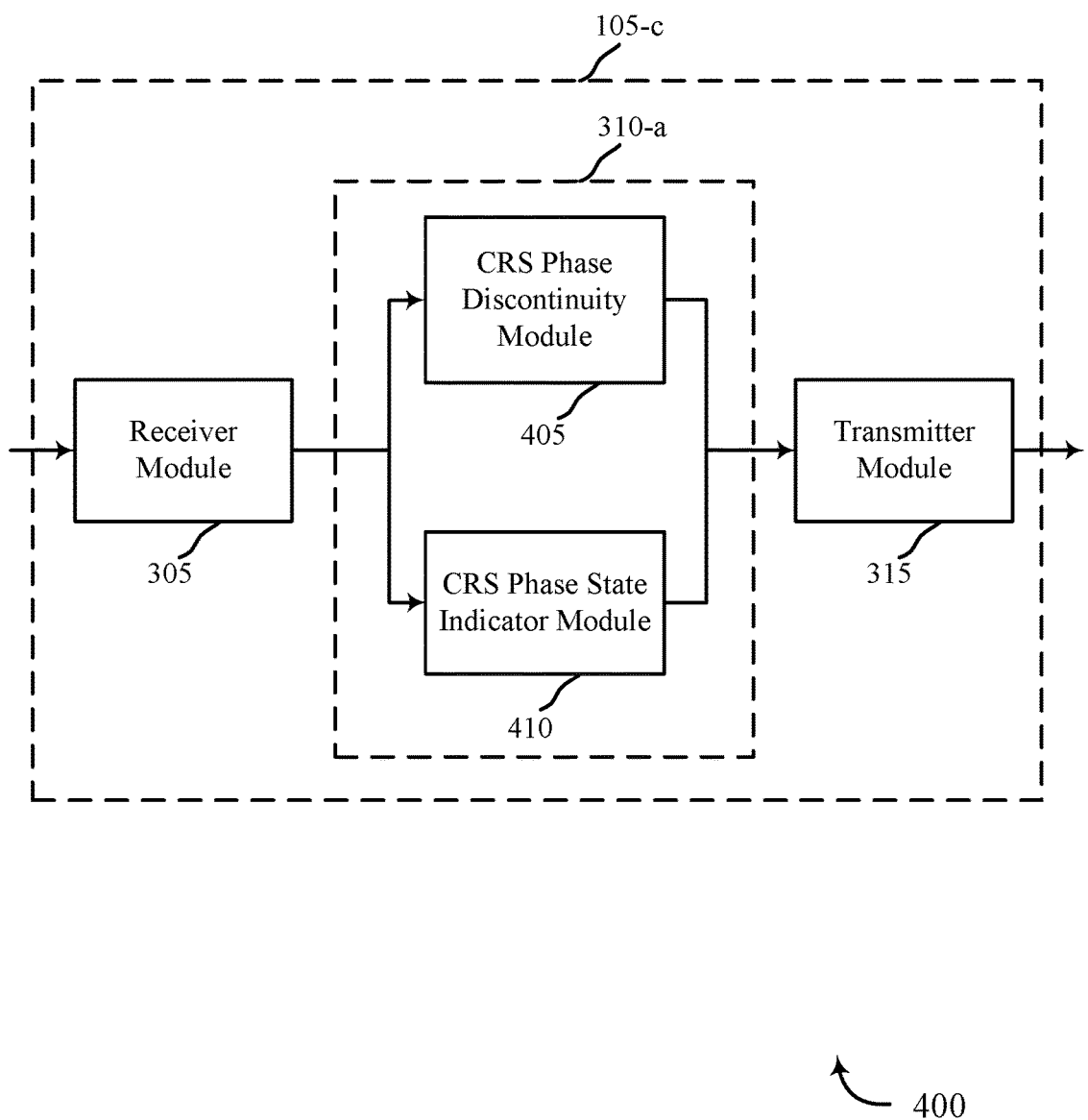
FIG. 4 is a block diagram illustrating a base station in accordance with various embodiments.
Figure 5:
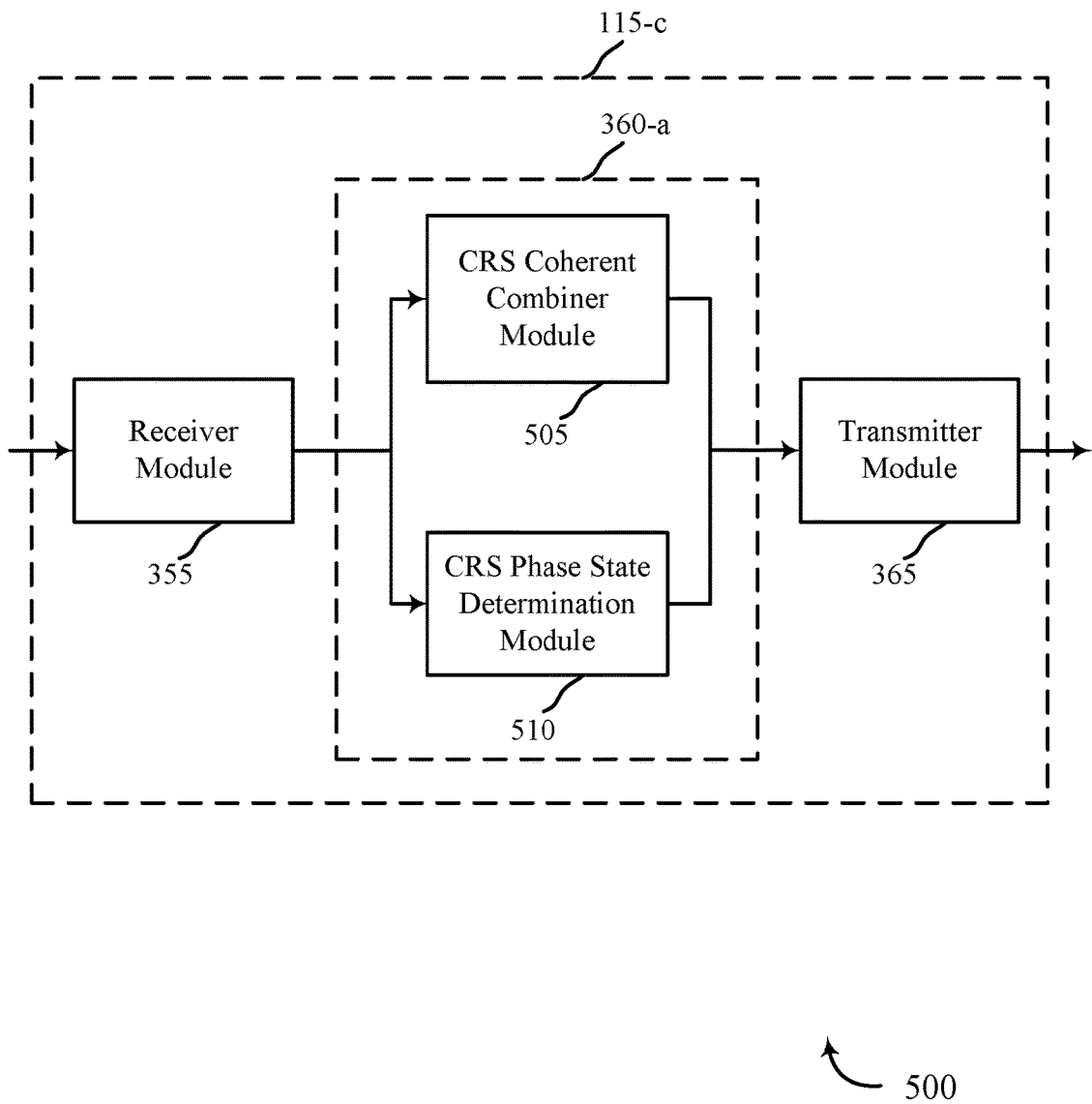
FIG. 5 is a block diagram illustrating a UE in accordance with various embodiments.

Turning now to FIG. 4 and FIG. 5, FIG. 4 shows a block diagram 400 illustrating a base station 105-*c* in accordance with various configurations, while FIG. 5 shows a block diagram 500 of a UE 115-*c* in accordance with various configurations. The UE 115-*c* may be an example of the UE 115 illustrated in FIGS. 1, 2, 3, and/or 8. The base station 105-*c* may be an example of the base station illustrated in FIGS. 1, 2, 3 and/or 8. The base station 105-*c* and the UE 115-*c* may be, or include, means for performing the functions described herein. The base station 105-*c* may include a receiver module 305, a common reference signal (CRS) management module 310-*a*, and/or a transmitter module 315. The CRS management module 310-*a* may include a CRS phase discontinuity module 405 and/or a CRS phase state indicator module 410. The CRS management module 310-*a* may be an example of the CRS management module 310 of FIG. 3 and/or FIG. 8. Each of the components of base station 105-*c* may be in communication with each other; in some cases, these components may be integrated into one or more modules. The UE 115-*c* may include a receiver module 355, a common reference signal (CRS) processing module 360-*a*, and a transmitter module 365. The CRS processing module 360-*a* may include a CRS phase state determination module 510 and/or a CRS coherent combiner module 505. The CRS processing module 360-*a* may be an example of the CRS management modules 360 of FIG. 3 and/or FIG. 8. Each of the components of UE 115-*c* may be in communication with each other; these components may be integrated into one or more modules.

These components of the UE 115-*c* or the base station 105-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some configurations, the receiver module 355 of UE 115-*c* may include a cellular receiver and may receive transmissions from a base station, such as base station 105-*c*, transmitted from transmitter module 315. The common reference signal (CRS) management module 310-*a* of the base station 105-*c* may manage CRS transmissions that may be transmitted via the transmitter module 315. The CRS processing module 360-*a* of the UE 115-*c* may process CRS transmission that may be received via the receiver module 355.

In some configurations, the CRS management module 310 may introduce a phase discontinuity between CRS transmissions on different subframes. For example, the CRS management module 310 may determine a phase discontinuity to use between a first common reference signal (CRS) transmission and a second CRS transmission. The CRS management module 310 and/or the transmitter module 315 may then transmit the first CRS transmission and the second CRS transmission without maintaining phase continuity. This may involve using the phase discontinuity.

Introducing phase discontinuity between CRS on different subframes may make it such that possible signal nulls on one subframe may likely not occur on a subsequent subframe. As a result, CRS coverage holes may be minimized as with non-coherent combining of the signal across different subframes probability of a coverage hole may be significantly reduced.

For UE 115-*c*, coherent combining may be allowed with a subframe and may be implemented utilizing CRS coherent combiner module 505. For example, 4 CRS tones per physical resource block (PRB) on two different OFDM symbols may be utilized. Phase continuity may be maintained between two OFDM symbols belonging to the same subframe. However, CRS on one subframe may not be used as a reference for CRS on a subsequent subframe in some cases.

The UE 115-*c* may utilize the CRS processing module 360-*a* through CRS phase state determination module 510 to determine that a phase continuity may not be assumed is used, for example, between a first common reference signal (CRS) transmission and a second CRS transmission. This may involve determining that a phase discontinuity is used. The CRS processing module 360-*a*, through CRS phase statement determination module 510, and/or the receiver module 355 may receive the first CRS transmission and the second CRS transmission without maintaining the phase continuity. In some cases, this may involve multiple common references signals that use the phase discontinuity.

In some cases, the base station 105-c may indicate to a UE, such as UE 115-c, whether the UE may coherently combine the signal on CRS tones across different subframes. Some configurations may utilize a static indication, which may be specified by a standard. For example, it may be that the standard configuration is for both a base station 105-c and/or UE 115-c to assume that phase discontinuity between subframes is not utilized; continuous CRS phase may be utilized in general. Signaling may be utilized then to indicate a change from continuous CRS phase to CRS phase discontinuity mode, or vice verse. Other configurations may utilize a semi static indication to the UE. For example, RRC signaling may be utilized for dedicated signaling, which may be unicast, and/or through system information, which may broadcast in one of SIBs. System information change procedure may be invoked when phase information changes, for example. This information may not be expected to change frequently, but some optimization may be utilized to access different cell types and/or potential impact on legacy UEs that may detect and measure New Carrier Types (NCT), for example. As used herein, "legacy UEs" may refer to UEs configured, or optimized for operation on a system employing single carriers and/or carrier types that pre-date NCT. For example, legacy UEs may be UEs configured for use on an LTE/LTE-A network that predates LTE/LTE-A Rel. 12. In some implementations, for example, if there are legacy UEs registered on the network, CRS phase discontinuity is not used, but if there are no legacy UEs registered on the network, CRS phase discontinuity may be used, and an indication of CRS phase discontinuity may be signaled by the base station 105-c to the UE.

Some configurations include utilizing the CRS phase state indicator module 410 of base station 105-c to indicate changes in CRS phase continuity. For example, the CRS phase state indicator module may indicate that it is changing from utilizing a phase discontinuity between CRS transmissions on different subframes to coherent phase. In some cases, the CRS phase state indicator module may indicate that phase continuity may be assumed. An indicator may be received by the CRS phase state determination module 510 of UE 115-c such that it may determine the change and may then start coherent combining CRS signals in some cases.

In order to ensure proper UE measurements, base station 115-c may maintain phase continuity whenever signaling indicates a change in CRS phase continuity. For example, at t_0, CRS phase may be not continuous; in this case, the UE may not coherently combine CRS signal across subframes. At t_1, base station 115-c may switch to continuous CRS phase; in some cases, base station 115-c may utilize CRS phase discontinuity module 405 to facilitate this change. At t_2, base station 105-c may indicate the change in CRS phase to continuous CRS phase; it may utilize the CRS phase state indicator module 410 to facilitate this process. At t_3, a UE, such as UE 115-c may process signaling that indicates the change and starts with coherent combining of CRS signal; UE 115-c may utilize the CRS phase state determination module 510 and/or CRS coherent combine module 505 to facilitate this process.

Base station 105-c may also indicate a change to utilize a discontinuous CRS phase utilizing CRS phase discontinuity module 405 and/or CRS phase state indicator module 410. For example, at t_0, base station 105-c may utilize a CRS phase that is continuous. In these cases, a UE, such as UE 115-c through CRS coherent combiner module 505, may coherently combine CRS signals across subframes. At t_1, base station 105-c, through CRS phase state indicator module 410, may indicate that it is going to change from utilizing a continuous CRS phase to utilizing a discontinuous CRS phase. At t_2, a UE, such as UE 115-c through CRS phase state determination module 510, may process the signaling that indicates the change and may stop with coherent combining of CRS signals. At t_3, the base station 105-c may switch to utilize a discontinuous CRS phase using CRS phase discontinuity module 405. In some cases, the base station 105-c may switch to utilize a discontinuous CRS phase before it transmits an indicator to a UE indicate the CRS phase change.

In some configurations in general, base station 105-c, through CRS phase state indicator module and/or transmitter module 315, may transmit an indicator to one or more UEs (such as UE 115-c) that indicates that phase continuity may not be assumed. This may involve transmitting an indicator the determined phase discontinuity is to be used. The indicator may be transmitted to the one or more UEs before the first CRS transmission and the second CRS transmission are transmitted without phase continuity or using the phase discontinuity.

In some cases, base station 105-c may determine that a continuous CRS phase is to be used between a third CRS transmission and a fourth CRS transmission utilizing the CRS phase state indicator module 410. The third CRS transmission and the fourth CRS transmission may be transmitted using the continuous CRS phase. An indicator may be transmitted utilizing the CRS phase state indicator module 410 to one or more UE(s) that indicates that phase continuity may be assumed, or that the use of the determined phase discontinuity is to be discontinued. Some configurations include transmitting an indicator through CRS phase state indicator module 410 to one or more UEs that indicates that a third CRS transmission and a fourth CRS transmission may be coherently combined.

On the UE side, a UE, such as UE 115-c, may be configured to receive common reference signals through the receiver 355 from a base station, such as base station 105-c. Utilizing the CRS phase state determination module 310 in general, the UE 115-c may determine that phase continuity may not be assumed, or that a phase discontinuity is used, between a first common reference signal (CRS) transmission and a second CRS transmission. The UE 115-c may receive the first CRS transmission and the second CRS transmission without maintaining phase continuity utilizing the receiver module 355 and/or the CRS phase state determination module 510. This may involve the use a phase discontinuity.

In some cases, determining that phase continuity may not be assumed, or that the phase discontinuity is used, between a first CRS transmission and a second CRS transmission may include receiving an indicator at the CRS phase state determination module 510 that indicates that phase continuity may not be assumed, or that the phase discontinuity is going to be used. In some cases, a third CRS transmission and a fourth CRS transmission may be received that use a continuous CRS phase. An indicator may be received at the CRS phase state determination module 510 that indicates phase continuity may be assumed, or that the determined phase discontinuity has been discontinued. In some cases, an indicator that a third CRS transmission and a fourth CRS transmission may be coherently combined may be received and utilized by the CRS phase state determination module 510.

In some cases, the phase discontinuity utilized by base station 105-*c* may occur between a first frame and a second frame. For example, CRS on NCT may be transmitted every 5 ms; and with a current pseudo-random sequence for CRS generally having a 10 ms periodicity, it may be possible to maintain CRS phase continuity within each frame, such as a 10 ms (one frame) duration. Additionally or alternatively, it may be, possible to have phase discontinuity at a frame boundary or boundaries. In the case where the phase discontinuity happens between frames, a UE such as UE 115 may still coherently combine the CRS transmissions (e.g., 2 CRS transmissions) in one frame. In other cases, phase discontinuity may occur between subframes of a given frame. For example, the first CRS transmission and the second CRS transmission may occur within a first frame.

In some configurations, the base station 105-*c*, through CRS phase discontinuity module 405, may introduce CRS phase discontinuity using a phase ramp up or a cycle delay diversity (CDD) process. For example, there may be CDD across antennas and variable cyclical delay in time to perturb the channel slowly over time. CDD may also be in frequency. Thus, CCD may vary a CRS phase in time or in frequency to introduce a phase discontinuity.

In some configurations, base station 105-*c* and/or UE 115-*c* may utilize New Carrier Type (NCT) with respect to transmitting and/or receiving CRS transmission, whether they utilize discontinuous CRS phase or continuous CRS phase.

Figure 6:
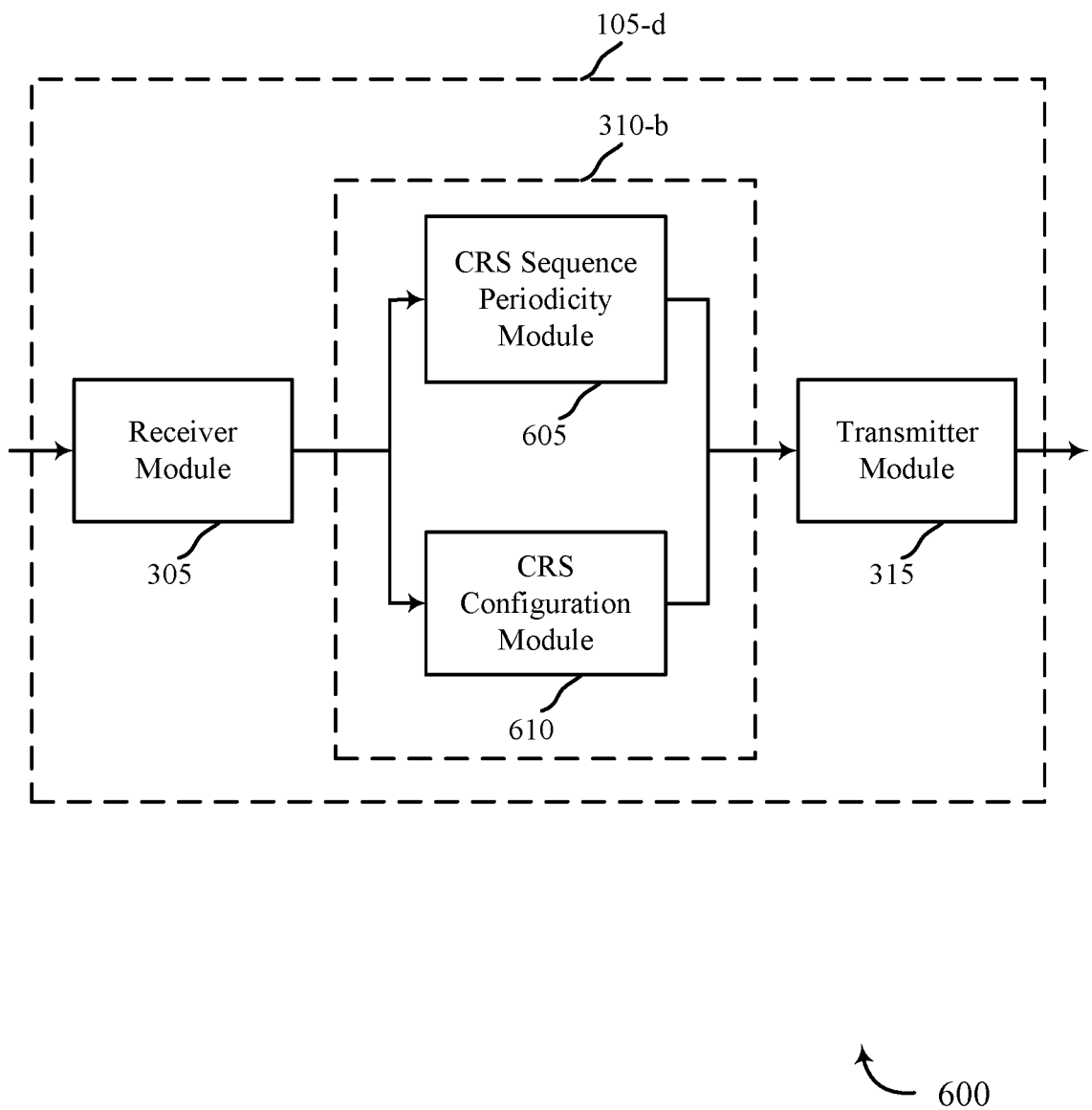
FIG. 6 is a block diagram illustrating a base station in accordance with various embodiments.
Figure 7:
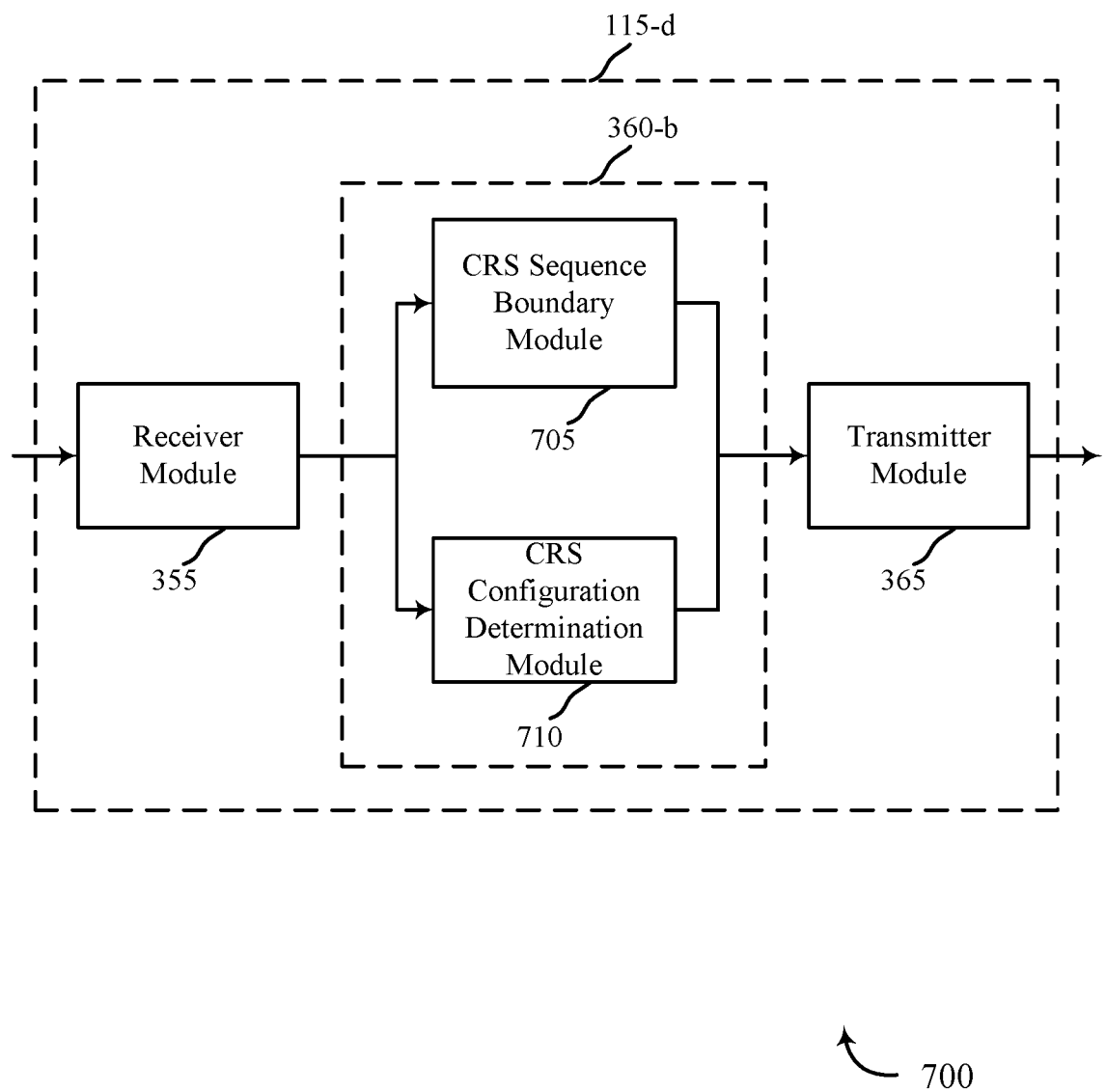
FIG. 7 is a block diagram illustrating a UE in accordance with various embodiments.

Turning now to FIG. 6 and FIG. 7, FIG. 6 shows a block diagram 600 illustrating a base station 105-*d* in accordance with various configurations, while FIG. 7 shows a block diagram 700 of a UE 115-*d* in accordance with various configurations. The UE 115-*d* may be an example of the UE 115 illustrated in FIGS. 1, 2, 3, and/or 8. The base station 105-*d* may be an example of the base station illustrated in FIGS. 1, 2, 3 and/or 8. The base station 105-*d* may include a receiver module 305, a common reference signal (CRS) management module 310-*b*, and/or a transmitter module 315. The CRS management module 310-*b* may include a CRS sequence periodicity module 605 and/or a CRS configuration module 610. The CRS management module 310-*b* may be an example of the CRS management module 310 of FIG. 3 and/or FIG. 8. Each of the components of base station 105-*d* may be in communication with each other; in some cases, these components may be integrated into one or more modules. The UE 115-*d* may include a receiver module 355, a common reference signal (CRS) processing module 360-*b*, and a transmitter module 365. The CRS processing module 360-*b* may include a CRS sequence boundary module 705 and/or a CRS configuration determination module 710. The CRS processing module 360-*b* may be an example of the CRS management modules 360 of FIG. 3 and/or FIG. 8. Each of the components of UE 115-*d* may be in communication with each other; these components may be integrated into one or more modules.

These components of the UE 115-*d* or the base station 105-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some configurations, the receiver module 335 of UE 115-*d* may include a cellular receiver and may receive transmissions from a base station, such as base station 105-*d*, transmitted from transmitter module 315. The common reference signal (CRS) management module 310-*b* of the base station 105-*d* may manage CRS transmissions that may be transmitted via the transmitter module 315. The CRS processing module 360-*b* of the UE 115-*d* may process CRS transmission that may be received via the receiver module 355.

In some configurations, the CRS management module 310-*b* of the base station 105-*d* and/or the CRS processing module 360-*b* of the UE 115-*d* may be utilized with respect CRS sequence initialization. For example, the CRS management module 310-*b* and/or the CRS processing module 360-*b* may determine an extended common reference signal sequence period with respect to an identified reference signal sequence period. The CRS management module 310-*b* and/or the CRS processing module 360-*b* may utilize the extended common reference signal sequence period in a variety of ways. The wireless communications system that base station 105-*d* and/or UE 115-*d* utilize may use a New Carrier Type (NCT) with respect to the CRS sequence initialization.

For example, CRS sequence initialization may be done with a specific periodicity in some cases, such as with a 10 ms periodicity; the same set of sequences may repeat every 10 ms, for example. For NCT, CRS has, generally, a 5 ms periodicity; and as a result, there may only be 2 possible CRS sequences transmitted by a cell (instead of 10 possible sequences as in the case when CRS may have a 1 ms periodicity). There may thus not be sufficient sequence randomization across cells. Measurement may thus be impacted (the impact of two or cells with bad sequence correlation may impact measurement performance, for example).

The tools and techniques provided utilizing either CRS management module 310-*b*, through CRS sequence periodicity module 605, and/or CRS processing module 360-*b*, through CRS sequence boundary module 705, may address these issues through extending a CRS sequence periodicity. For example, with respect to NCT, the number of possible sequences per cell in NCT may be more than 2 (e.g., 40 ms (thus 8 possible sequences) or 50 ms (thus 10 possible sequences)).

In order to measure neighboring cells, UE 115-*d* may determine the corresponding CRS sequences used in a (sub)frame utilizing CRS sequence boundary module 705, for example. In some general cases, to measure neighboring cells, a UE, such as UE 115-*d*, may detect a primary synchronization signal (PSS) and/or a secondary synchronization signal (SSS) from which to derive a 10 ms boundary for the cell, for example, and the corresponding CRS sequences. With extended CRS sequence initialization, UE 115-*d* may (e.g., using 40 ms) detect PSS and/or SSS, followed by physical broadcast channel (PBCH) detection to determine the beginning of a 40 ms period, and then derive CRS sequences for measurement utilizing CRS sequence boundary module 705. In some cases, UE 115-*d* may detect PSS and/or SSS, and using four possible CRS sequences for measurement.

Thus, in some configurations, UE 115-*d*, through CRS processing module 360-*b* and/or CRS sequence boundary module 705 in particular, may determine, at UE 115-*d*, an extended CRS sequence boundary with respect to the extended common reference signal sequence period. Determining, at the UE 115-d, the extended CRS sequence boundary with respect to the extended common reference signal sequence period may include: detecting a primary synchronization signal (PSS), a secondary synchronization signal (SSS), and a physical broadcast channel (PBCH) to determine the extended CRS sequence boundary. One or more CRS sequences for measurement may be derived after determining the extended CRS sequence boundary. Determining, at the UE 115-d, the CRS sequence boundary with respect to the extended common reference signal sequence period may include: detecting a primary synchronization signal (PSS) or a secondary synchronization signal (SSS); and/or utilizing multiple CRS sequence hypotheses for measurement.

In some cases, base station 105-d, through CRS management module 310-b and/or CRS sequence periodicity module 605 in particular, may transmit a primary synchronization signal (PSS), a secondary synchronization signal (SSS), and physical broadcast channel (PBCH) to facilitate one or more UEs (e.g., UE 115-d) determining an extended CRS sequence boundary.

In some configurations, CRS sequence initialization may involve base station 105-d determining and/or transmitting a CRS configuration to one or more UEs (e.g., UE 115-d) utilizing CRS configuration module 610, CRS management module 310-b, and/or transmitter module 315. The CRS configuration may depend upon a system bandwidth. In some configurations, UE 115-d may be configured to receive and/or determine a CRS configuration utilizing CRS configuration determination module 710, CRS processing module 360-b, and/or receiver module 355.

For example, some configurations may introduce CRS time and/or frequency mapping as a function of system bandwidth. In some cases, base station 105-d may indicate this information through a physical broadcast channel, such as an enhanced physical broadcast channel (ePBCH). Small system bandwidth, for example, may have a larger number of CRS subframes, and larger system bandwidth may have a smaller number of CRS subframes; the CRS itself may span the entire or partial bandwidth. In some cases, additional dependencies may be Frame Structure (FS) FS1 and FS2, and/or downlink/uplink configuration. For instance, for FS2, some configurations may have two DL subframes. For FS1, Multicast-Broadcast Single Frequency Network (MBSFN) may be another factor, depending on how MBSFN may be defined, (e.g., for standalone NCT).

Figure 8:
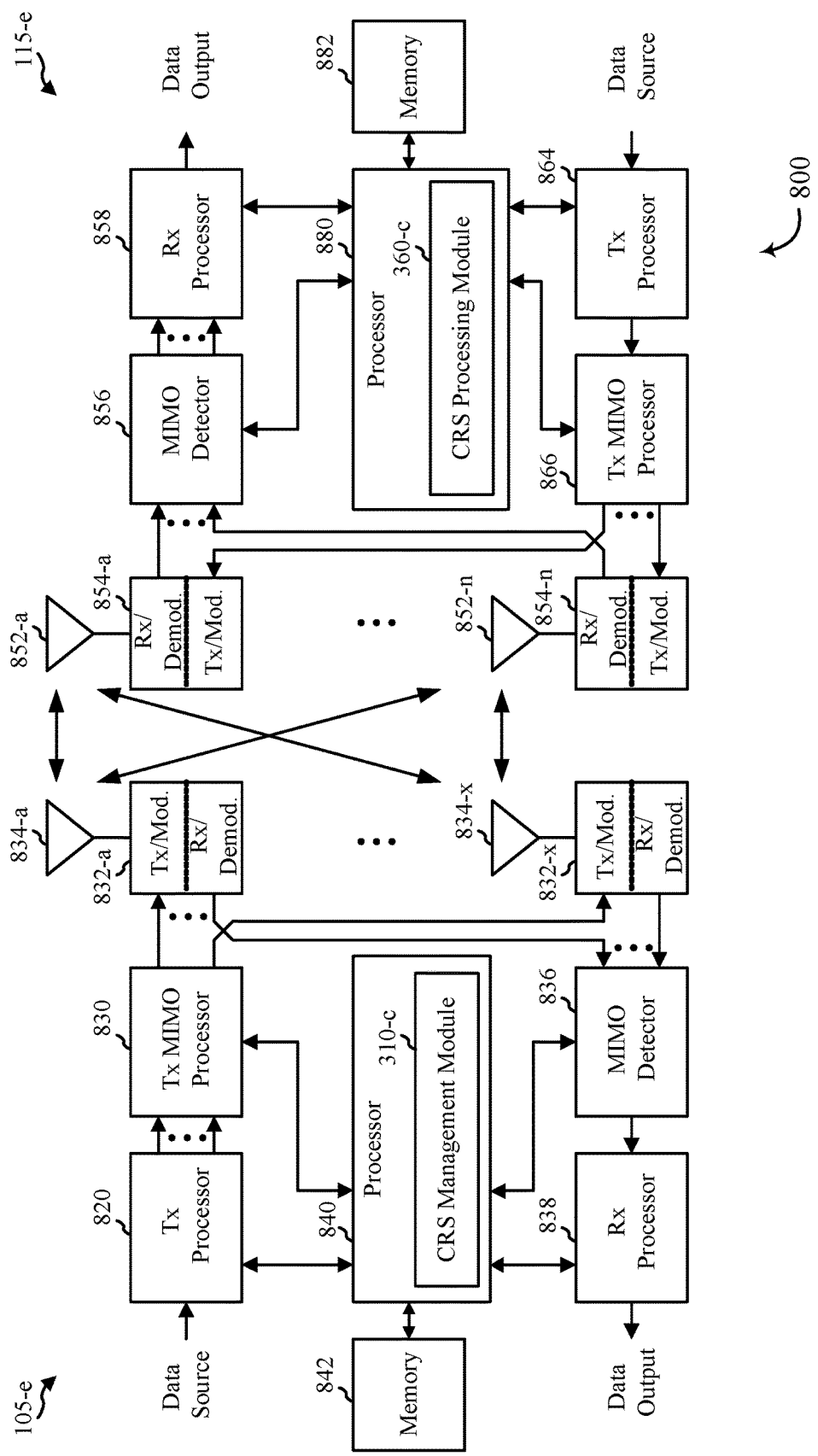
FIG. 8 is a block diagram of a MIMO communication system including an eNB and a UE in accordance with various embodiments.

FIG. 8 is a block diagram of a MIMO communication system 800 including an eNB 105-e and a UE 115-e. This system 800 may illustrate aspects of the system 100 of FIG. 1. The eNB 105-e may be an example of the eNB 105 of FIGS. 1, 2, 3, 4, and/or 6. The UE 115-e may be an example of the UE 115 of FIGS. 1, 2, 3, 5, and/or 7. The eNB 105-e may be equipped with antennas 834-a through 834-x, and the UE 115-e may be equipped with antennas 852-a through 852-n. In the system 800, the eNB 105-e may be able to send data over multiple communication links at the same time. Each communication link may be called a "layer" and the "rank" of the communication link may indicate the number of layers used for communication. For example, in a 2×2 MIMO system where eNB 105-e transmits two "layers," the rank of the communication link between the eNB 105-e and the UE 115-e is two.

At the eNB 105-e, a transmit processor 820 may receive data from a data source. The transmit processor 820 may process the data. The transmit processor 820 may also generate reference symbols, and a cell-specific reference signal. A transmit (TX) MIMO processor 830 may perform spatial processing (e.g., precoding) on data symbols, control symbols, and/or reference symbols, if applicable, and may provide output symbol streams to the transmit modulators 832-a through 832-x. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink signal. In one example, downlink signals from modulators 832-a through 832-x may be transmitted via the antennas 834-a through 834-x, respectively. A receive processor 838 may process (e.g., demodulate, deinterleave, and decode) the detected symbols, providing decoded data for the UE 115-e to a data output, and provide decoded control information to a processor 840, or memory 842. Processor 840 may also communicate with transmit processor 820 and/or transmit MIMO processor 830. In some embodiments, a processor 840 coupled with memory 842 may include a common reference signal management module 310-c to implement the systems and methods described herein. The common reference signal management module 310-c may be examples of the module 310 of FIGS. 3, 4, and/or 6.

At the UE 115-e, the UE antennas 852-a through 852-n may receive the downlink signals from the eNB 105-e and may provide the received signals to the demodulators 854-a through 854-n, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-a through 854-n, perform MIMO detection on the received symbols if applicable, and provide detected symbols. A receive processor 858 may process (e.g., demodulate, deinterleave, and decode) the detected symbols, providing decoded data for the UE 115-e to a data output, and provide decoded control information to a processor 880, or memory 882. In some embodiments, the processor 880 may include a common reference signal processing module 360-c to implement the systems and methods described herein. The common reference signal processing module 360-c may be examples of the module 360 of FIGS. 3, 5, and/or 7.

On the uplink, at the UE 115-e, a transmit processor 864 may receive and process data from a data source. The transmit processor 864 may also generate reference symbols for a reference signal. The symbols from the transmit processor 864 may be precoded by a transmit MIMO processor 866 if applicable, further processed by the demodulators 854-a through 854-n (e.g., for SC-FDMA, etc.), and be transmitted to the eNB 105-e in accordance with the transmission parameters received from the eNB 105-e. At the eNB 105-e, the uplink signals from the UE 115-e may be received by the antennas 834, processed by the demodulators 832, detected by a MIMO detector 836 if applicable, and further processed by a receive processor. The receive processor 838 may provide decoded data to a data output and to the processor 840. The components of the UE 115-e may, individually or collectively, be implemented with one or more Application Specific Integrated Circuits (ASICs) adapted to perform some or all of the applicable functions in hardware. Each of the noted modules may be a means for performing one or more functions related to operation of the system 800.

Similarly, the components of the eNB 105-*e* may, individually or collectively, be implemented with one or more Application Specific Integrated Circuits (ASICs) adapted to perform some or all of the applicable functions in hardware. Each of the noted components may be a means for performing one or more functions related to operation of the system 800.

Figure 9A:
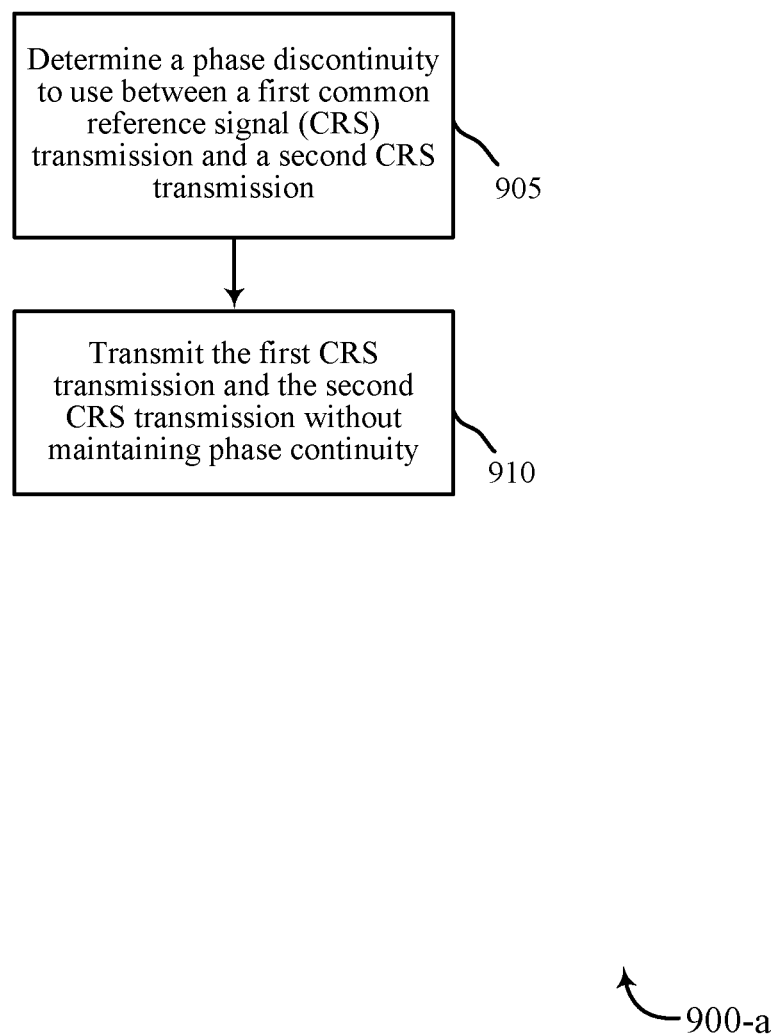
FIG. 9A is a flow chart illustrating a method for wireless communications in accordance with various embodiments.

FIG. 9A is a flow chart illustrating one embodiment of a method 900-*a* for wireless communications. For clarity, the method 900-*a* is described below with reference to the base stations 105 of FIGS. 1, 2, 3, 4, and/or 8. In one implementation, the common reference signal management module 310 of FIGS. 3, 4, and/or 8 may execute one or more sets of codes to control the functional elements of the base station 105 to perform the functions described below.

At block 905, a phase discontinuity to use between a first common reference signal (CRS) transmission and a second CRS transmission may be determined. At block 910; the first CRS transmission and the second CRS transmission may be transmitted without maintaining phase continuity. In some cases, this may include transmitting multiple common reference signals using phase discontinuity.

Method 900-*a* may also include transmitting an indicator to one or more user equipment (UEs) that indicates that that phase continuity cannot be assumed, such as when the determined phase discontinuity is to be used. The first indicator may be transmitted to the one or more UEs before the first CRS transmission and the second CRS transmission without maintaining phase continuity. In some cases, this may include transmitting multiple common reference signals using phase discontinuity.

In some cases, it may be determined that a continuous CRS phase is to be used between a third CRS transmission and a fourth CRS transmission. The third CRS transmission and the fourth CRS transmission may be transmitted using the continuous CRS phase. An indicator may be transmitted to one or more user equipment (UEs) that indicates that phase continuity may be assumed. In some cases, an indicator may indicate that determined phase discontinuity is to be discontinued.

Some embodiments of method 900-*a* include transmitting an indicator to one or more user equipment (UEs) that indicates that a third CRS transmission and a fourth CRS transmission may be coherently combined.

For method 900-*a*, the phase discontinuity may occur between a first frame and a second frame in some cases. The first CRS transmission and the second CRS transmission may occur within a first frame in some cases. The phase discontinuity may be introduced using a phase ramp up. In some cases, phase discontinuity may be introduced using a cycle delay diversity (CDD) process that may vary a CRS phase in time or in frequency.

The wireless communications system utilized for method 900-*a* may use a New Carrier Type (NCT) for the first CRS transmission and the second CRS transmission.

Therefore, the method 900-*a* may provide for transmitting common reference signals in a wireless communications system. It should be noted that the method 900-*a* is just one implementation and that the operations of the method 900-*a* may be rearranged or otherwise modified such that other implementations are possible.

Figure 9B:
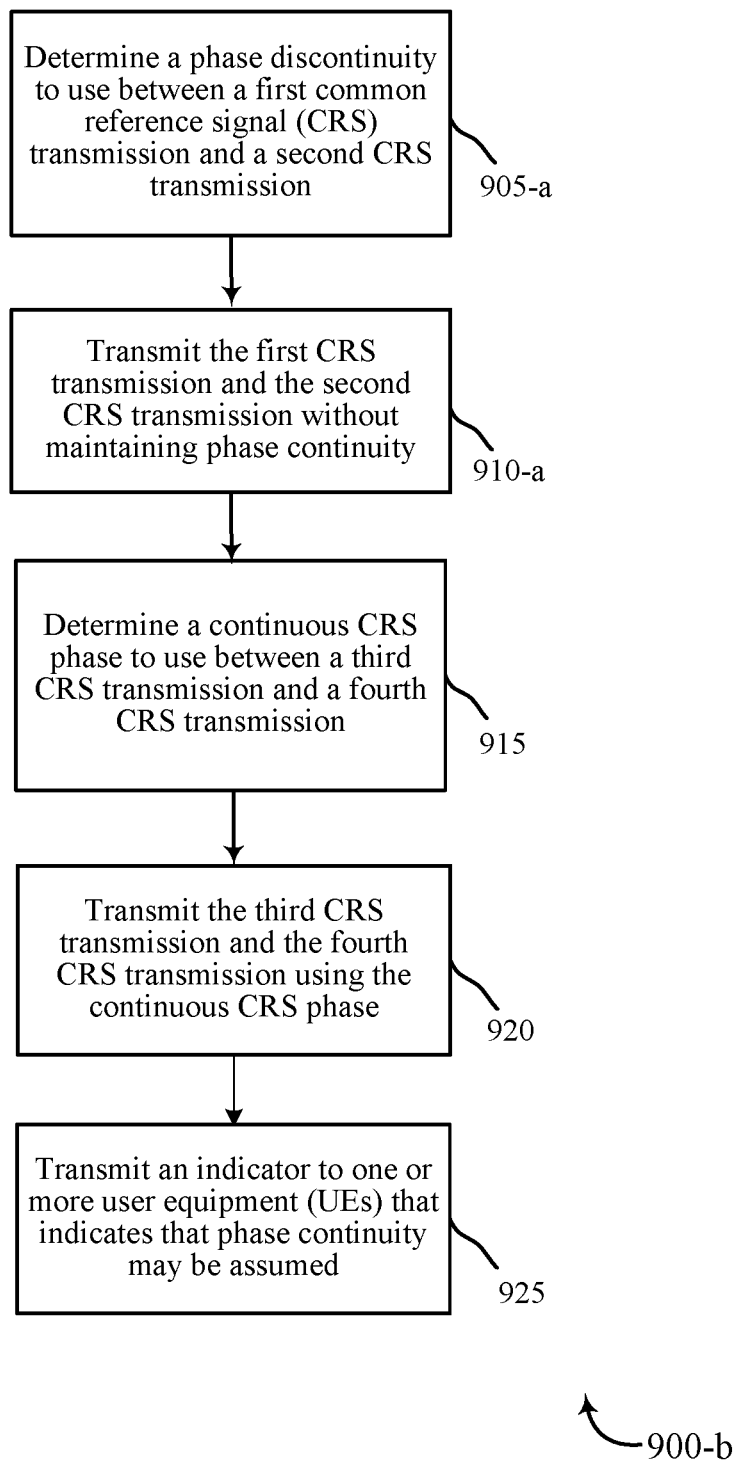
FIG. 9B is a flow chart illustrating a method for wireless communications in accordance with various embodiments.

FIG. 9B is a flow chart illustrating one embodiment of a method 900-*b* for wireless communications. For clarity, the method 900-*b* is described below with reference to the base stations 105 of FIGS. 1, 2, 3, 4, and/or 8. In one implementation, the common reference signal management module 310 of FIGS. 3, 4, and/or 8 may execute one or more sets of codes to control the functional elements of the base station 105 to perform the functions described below. Method 900-*b* may be an example of method 900-*a* of FIG. 9A

At block 905-*a*, a phase discontinuity to use between a first common reference signal (CRS) transmission and a second CRS transmission may be determined. At block 910-*a*; the first CRS transmission and the second CRS transmission may be transmitted without maintaining phase continuity. At block 915, it may be determined that a continuous CRS phase is to be used between a third CRS transmission and a fourth CRS transmission. The third CRS transmission and the fourth CRS transmission may be transmitted using the continuous CRS phase at block 920. An indicator may be transmitted to one or more user equipment (UEs) that indicates that phase continuity may be assumed at block 925.

Figure 10A:
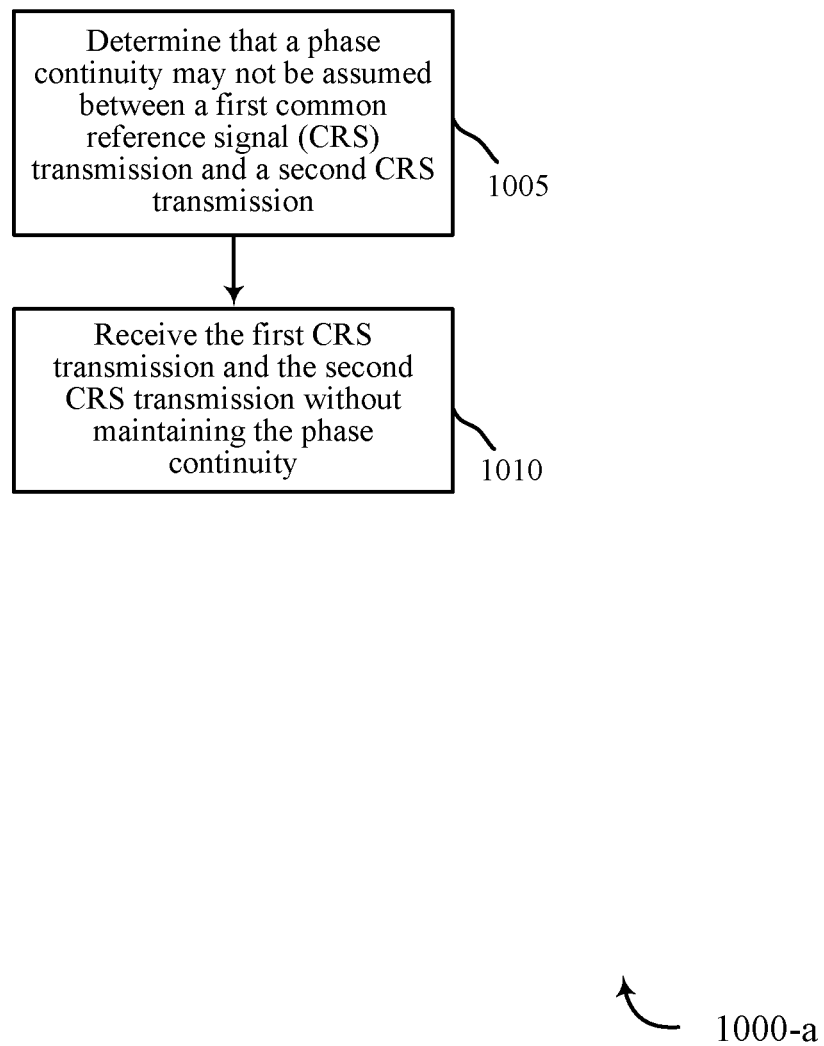
FIG. 10A is a flow chart illustrating a method for wireless communications in accordance with various embodiments.

FIG. 10A is a flow chart illustrating one embodiment of a method 1000-*a* for wireless communications. For clarity, the method 1000-*a* is described below with reference to a UE 115 of FIGS. 1, 2, 3, 5, and/or 8. In one implementation, the common reference signal processing module 360 of FIGS. 3, 5, and/or 8 may execute one or more sets of codes to control the functional elements of the UE 115 to perform the functions described below.

At block 1005, it may be determined that a phase continuity may not be assumed between a first common reference signal (CRS) transmission and a second CRS transmission. Additionally or alternatively, it may be determined that a phase discontinuity is used. At block 1010, the first CRS transmission and the second CRS transmission may be received without maintaining the phase continuity. In some cases, this may involve the use of the phase discontinuity.

Determining that the phase continuity may not be assumed between a first CRS transmission and a second CRS transmission may include receiving an indicator that indicates that the phase continuity may not be assumed. This may involve receiving an indicator that indicates that a phase discontinuity is to be used. In some cases, a third CRS transmission and a fourth CRS transmission may be received that use a continuous CRS phase. An indicator may be received that indicates the phase continuity may be assumed, or that the determined phase discontinuity has been discontinued. Method 1000-*a* may also include receiving an indicator that a third CRS transmission and a fourth CRS transmission may be coherently combined.

For method 1000-*a*, the phase discontinuity may occur between a first frame and a second frame. In some cases, the first CRS transmission and the second CRS transmission may occur within a first frame.

The wireless communications system for method 1000-*a* may use a New Carrier Type (NCT) with respect to the first CRS transmission and the second CRS transmission.

Therefore, the method 1000-*a* may provide for receiving common reference signals in a wireless communications system. It should be noted that the method 1000-*a* is just one implementation and that the operations of the method 1000-*a* may be rearranged or otherwise modified such that other implementations are possible.

Figure 10B:
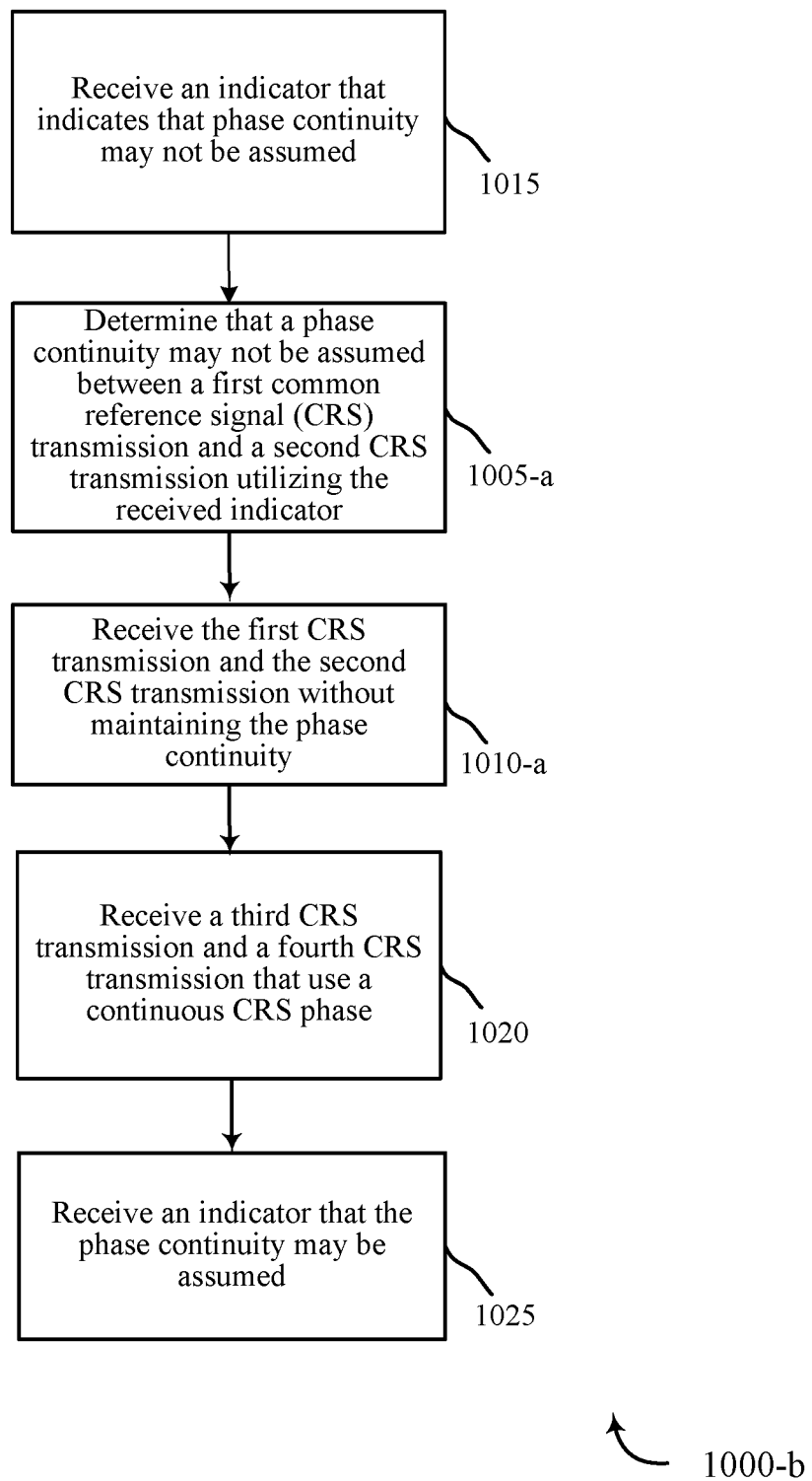
FIG. 10B is a flow chart illustrating a method for wireless communications in accordance with various embodiments.

FIG. 10B is a flow chart illustrating one embodiment of a method 1000-*b* for wireless communications. For clarity, the method 1000-*b* is described below with reference to a UE 115 of FIGS. 1, 2, 3, 5, and/or 8. In one implementation, the common reference signal processing module 360 of FIGS. 3, 5, and/or 8 may execute one or more sets of codes to control the functional elements of the UE 115 to perform the functions described below. Method 1000-*b* may be an example of method 1000-*a* of FIG. 10A.

At block 1015, an indicator may be received that indicates that the phase continuity may not be assumed. This may involve receiving an indicator that indicates that a phase discontinuity is to be used. At block 1005-a, it may be determined that a phase continuity may not be assumed is used between a first common reference signal (CRS) transmission and a second CRS transmission; this may involve utilizing the received indicator. In particular, a phase discontinuity may be used. At block 1010-a, the first CRS transmission and the second CRS transmission may be received without maintaining the phase continuity. In some cases, this may involve the use of the phase discontinuity. At block 1020, a third CRS transmission and a fourth CRS transmission may be received that use a continuous CRS phase. At block 1025, an indicator may be received that indicates the phase continuity may be assumed, or that the determined phase discontinuity has been discontinued.

Figure 11A:
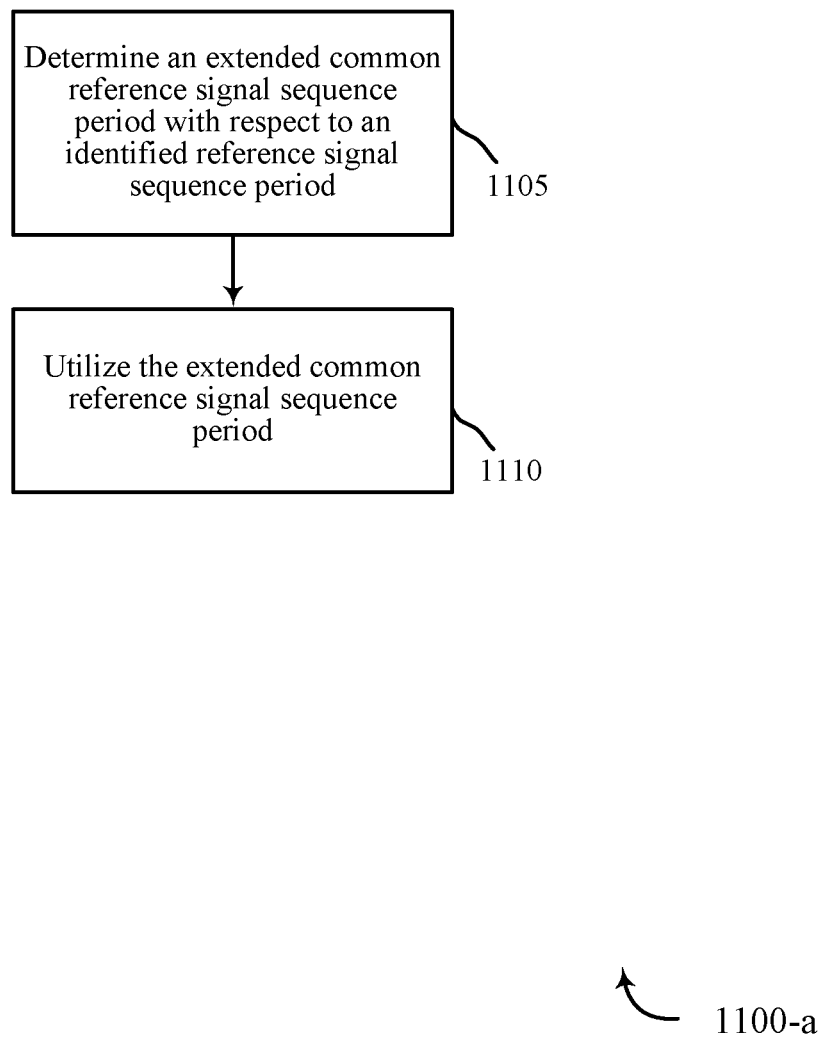
FIG. 11A is a flow chart illustrating a method for wireless communications in accordance with various embodiments.

FIG. 11A is a flow chart illustrating one embodiment of a method 1100-a for wireless communications. For clarity, the method 1100-a is described below with reference to a UE 115 of FIGS. 1, 2, 3, 7, and/or 8 or a base station 105 of FIGS. 1, 2, 3, 6, and/or 8. In one implementation, the common reference signal processing module 360 of FIGS. 3, 7, and/or 8 or the common reference signal management module 310 of FIGS. 3, 6, and/or 8 may execute one or more sets of codes to control the functional elements of the UE 115 and/or base station 105 to perform the functions described below.

At block 1105, an extended common reference signal sequence period may be determined with respect to an identified reference signal sequence period. At block 1110, the extended common reference signal sequence period may be utilized. The wireless communications system of method 1100-a may use a New Carrier Type (NCT) with respect to the CRS sequence initialization.

Method 1100-a may include determining, at a user equipment (UE), an extended CRS sequence boundary with respect to the extended common reference signal sequence period. Determining, at the UE, the extended CRS sequence boundary with respect to the extended common reference signal sequence period may include: detecting a primary synchronization signal (PSS), a secondary synchronization signal (SSS), and physical broadcast channel (PBCH) to determine the extended CRS sequence boundary. One or more CRS sequences for measurement may be derived after determining the extended CRS sequence boundary.

Determining, at the UE, the CRS sequence boundary with respect to the extended common reference signal sequence period may include: detecting a primary synchronization signal (PSS) or a secondary synchronization signal (SSS); and/or utilizing a plurality of CRS sequence hypotheses for measurement.

In some embodiments, method 1100-a may include receiving a CRS configuration at a UE. The CRS configuration may depend upon a system bandwidth.

Some embodiments of method 1100-a implemented utilizing a base station may include transmitting a primary synchronization signal (PSS), a secondary synchronization signal (SSS), and physical broadcast channel (PBCH) to facilitate one or more UEs determining an extended CRS sequence boundary. In some cases, a CRS configuration may be transmitted to one or more UEs. The CRS configuration may depend upon a system bandwidth.

Therefore, the method 1100-a may provide for transmitting and/or receiving common reference signals in a wireless communications system. It should be noted that the method 1100-a is just one implementation and that the operations of the method 1100-a may be rearranged or otherwise modified such that other implementations are possible.

Figure 11B:
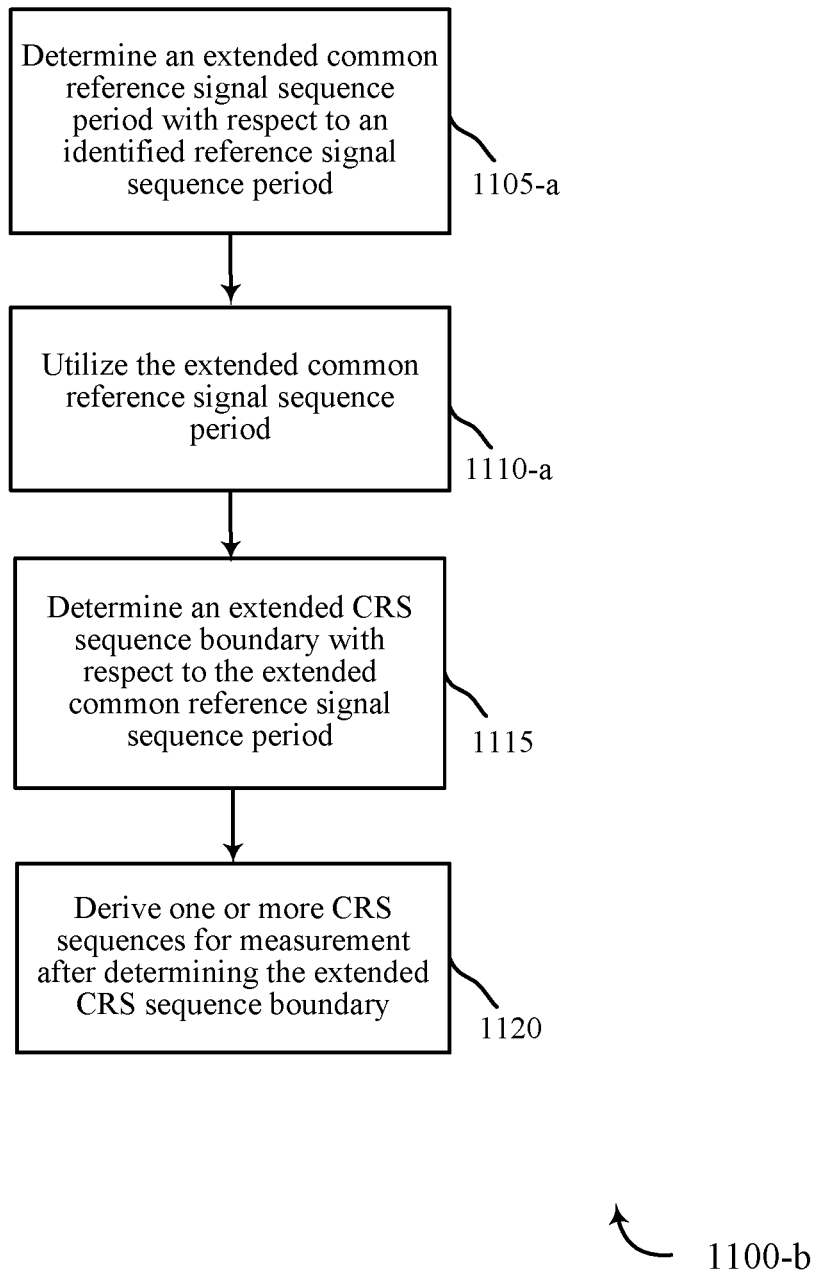
FIG. 11B is a flow chart illustrating a method for wireless communications in accordance with various embodiments.

FIG. 11B is a flow chart illustrating one embodiment of a method 1100-b for wireless communications. For clarity, the method 1100-b is described below with reference to a UE 115 of FIGS. 1, 2, 3, 7, and/or 8. In one implementation, the common reference signal processing module 360 of FIGS. 3, 7, and/or 8 may execute one or more sets of codes to control the functional elements of the UE 115 to perform the functions described below. Method 1100-b may be an example of method 1100-a of FIG. 11A.

At block 1105-a, an extended common reference signal sequence period may be determined with respect to an identified reference signal sequence period. At block 1110-a, the extended common reference signal sequence period may be utilized. At block 1115, an extended CRS sequence boundary may be determined with respect to the extended common reference signal sequence period. At block 1120, one or more CRS sequences for measurement may be derived after determining the extended CRS sequence boundary.

Figure 11C:
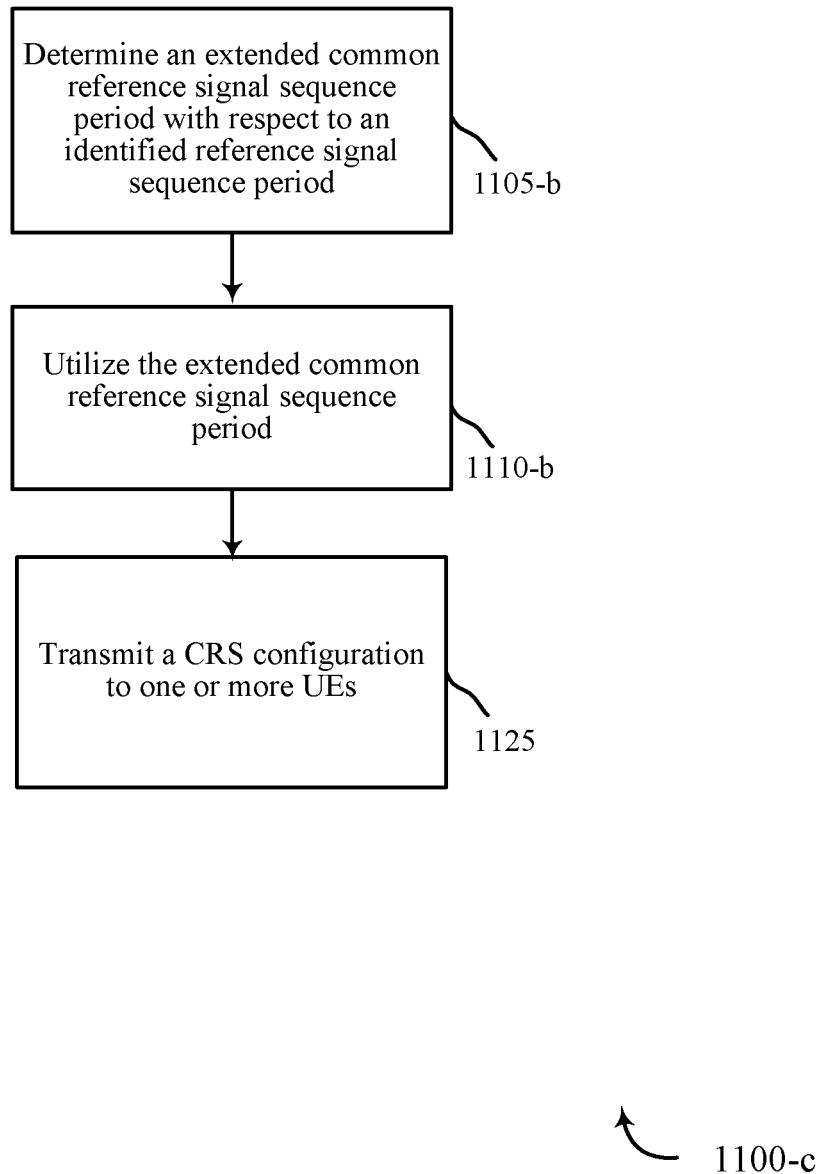
FIG. 11C is a flow chart illustrating a method for wireless communications in accordance with various embodiments.

FIG. 11C is a flow chart illustrating one embodiment of a method 1100-c for wireless communications. For clarity, the method 1100-c is described below with reference to a base station 105 of FIGS. 1, 2, 3, 6, and/or 8. In one implementation, the common reference signal management module 310 of FIGS. 3, 6, and/or 8 may execute one or more sets of codes to control the functional elements of the base station 105 to perform the functions described below. Method 1100-c may be an example of method 1100-a of FIG. 11A.

At block 1105-b, an extended common reference signal sequence period may be determined with respect to an identified reference signal sequence period. At block 1110-b, the extended common reference signal sequence period may be utilized. At block 1125, a CRS configuration may be transmitted to one or more UEs. The CRS configuration may depend upon a system bandwidth.

In additional embodiments, a method for transmitting common reference signals in a wireless communications system is provided. The method may include: determining a phase discontinuity to use between a first common reference signal (CRS) transmission and a second CRS transmission; and/or transmitting the first CRS transmission and the second CRS transmission without maintaining a phase continuity.

Some configurations include transmitting an indicator to one or more user equipment (UE) that indicates that the phase continuity cannot be assumed. The indicator may be transmitted to the one or more UEs before the first CRS transmission and the second CRS transmission are transmitted without maintaining the phase continuity.

In some cases, the method may include: determining a continuous CRS phase to use between a third CRS transmission and a fourth CRS transmission; transmitting the third CRS transmission and the fourth CRS transmission using the continuous CRS phase; and/or transmitting an indicator to one or more user equipment (UE) that indicates that the phase continuity may be assumed. In some situations, an indicator may be transmitted to one or more user equipment (UE) that indicates that a third CRS transmission and a fourth CRS transmission may be coherently combined.

In other embodiments, a method for common reference signal (CRS) sequence initialization in a wireless communications system is provided. The method may include: determining an extended common reference signal sequence period with respect to an identified reference signal sequence period; and/or utilizing the extended common reference signal sequence period. The wireless communications system may use a New Carrier Type (NCT) with respect to the CRS sequence initialization.

Some configurations include determining, at a user equipment (UE), an extended CRS sequence boundary with respect to the extended common reference signal sequence period. Determining, at the UE, the extended CRS sequence boundary with respect to the extended common reference signal sequence period may include detecting a primary synchronization signal (PSS), a secondary synchronization signal (SSS), and physical broadcast channel (PBCH) to determine the extended CRS sequence boundary. One or more CRS sequences for measurement may be derived after determining the extended CRS sequence boundary.

In some situations, determining, at the UE, the CRS sequence boundary with respect to the extended common reference signal sequence period may include: detecting a primary synchronization signal (PSS) or a secondary synchronization signal (SSS); and/or utilizing a plurality of CRS sequence hypotheses for measurement. Some configurations include transmitting a primary synchronization signal (PSS), a secondary synchronization signal (SSS), and physical broadcast channel (PBCH) to facilitate one or more UEs determining an extended CRS sequence boundary.

Some configurations include receiving a CRS configuration at a UE. The CRS configuration may depend upon a system bandwidth. Some configurations include transmitting a CRS configuration to one or more UEs, where the CRS configuration may depend upon a system bandwidth.

In some embodiments, a system for transmitting common reference signals is provided. The system may include: means for determining a phase discontinuity to use between a first common reference signal (CRS) transmission and a second CRS transmission; and/or means for transmitting the first CRS transmission and the second CRS transmission without maintaining a phase continuity.

The system may further include means for transmitting an indicator to one or more user equipment (UE) that indicates that the phase continuity cannot be assumed. The indicator may be transmitted to the one or more UEs before the first CRS transmission and the second CRS transmission are transmitted without maintaining the phase continuity. In some cases, the system may include: means for determining a continuous CRS phase to use between a third CRS transmission and a fourth CRS transmission; means for transmitting the third CRS transmission and the fourth CRS transmission using the continuous CRS phase; and/or means for transmitting an indicator to one or more user equipment (UE) that indicates that the phase continuity may be assumed. In some configurations, the system may include means for transmitting an indicator to one or more user equipment (UE) that indicates that a third CRS transmission and a fourth CRS transmission may be coherently combined.

For the system, the phase discontinuity may occur between a first frame and a second frame. In some cases, the first CRS transmission and the second CRS transmission may occur within a first frame. The phase discontinuity may be introduced using a phase ramp up. The phase discontinuity may be introduced using a cycle delay diversity (CDD) process that varies a CRS phase in time or in frequency. The system may use a New Carrier Type (NCT) for the first CRS transmission and the second CRS transmission.

In some embodiments, a system for common reference signal (CRS) sequence initialization is provided. The system may include: means for determining an extended common reference signal sequence period with respect to an identified reference signal sequence period; and/or means for utilizing the extended common reference signal sequence period. The system may a New Carrier Type (NCT) with respect to the CRS sequence initialization.

The system may include means for determining, at a user equipment (UE), an extended CRS sequence boundary with respect to the extended common reference signal sequence period. The means for determining, at the UE, the extended CRS sequence boundary with respect to the extended common reference signal sequence period may include means for detecting a primary synchronization signal (PSS), a secondary synchronization signal (SSS), and physical broadcast channel (PBCH) to determine the extended CRS sequence boundary. The system may further include means for deriving one or more CRS sequences for measurement after determining the extended CRS sequence boundary. The means for determining, at the UE, the CRS sequence boundary with respect to the extended common reference signal sequence period may include: means for detecting a primary synchronization signal (PSS) or a secondary synchronization signal (SSS); and/or utilizing multiple CRS sequence hypotheses for measurement. Some configurations may include means for transmitting a primary synchronization signal (PSS), a secondary synchronization signal (SSS), and physical broadcast channel (PBCH) to facilitate one or more UEs determining an extended CRS sequence boundary.

Some configurations may include means for receiving a CRS configuration at a UE. The CRS configuration may depend upon a system bandwidth. Some configurations include means for transmitting a CRS configuration to one or more UEs, where the CRS configuration may depend upon a system bandwidth.

In some embodiments, a computer program product for wireless communications systems is provided that may include a non-transitory computer-readable medium, which may include: code for determining a phase discontinuity to use between a first common reference signal (CRS) transmission and a second CRS transmission; and/or code for transmitting the first CRS transmission and the second CRS transmission without maintaining phase continuity.

In some embodiments, a computer program product for wireless communications systems is provided that may include a non-transitory computer-readable medium, which may include: code for determining an extended common reference signal sequence period with respect to an identified reference signal sequence period; and/or code for utilizing the extended common reference signal sequence period.

In some embodiments, a wireless communications device is provided that may include a processor that may be configured to: determine an extended common reference signal sequence period with respect to an identified reference signal sequence period; and/or utilize the extended common reference signal sequence period.

For some configurations, the phase discontinuity may occur between a first frame and a second frame. The first CRS transmission and the second CRS transmission may occur within a first frame. The phase discontinuity may be introduced using a phase ramp up. The phase discontinuity may be introduced using a cycle delay diversity (CDD) process that varies a CRS phase in time or in frequency. The method may be implemented in some cases with wireless communications system that uses a New Carrier Type (NCT) for the first CRS transmission and the second CRS transmission.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   transmitting an indicator that a phase discontinuity is used between a first common reference signal (CRS) transmission and a second CRS transmission;
   transmitting the first CRS transmission and the second CRS transmission with the phase discontinuity between the first CRS transmission and the second CRS transmission as indicated;
   transmitting an indicator that a phase continuity is used between a third CRS transmission and a fourth CRS transmission, the indicator that the phase continuity is used indicating that the third CRS transmission and the fourth CRS transmission are coherently combinable; and transmitting the third CRS transmission and the fourth CRS transmission with the phase continuity between the third CRS transmission and the fourth CRS transmission as indicated.

2. The method of claim 1, wherein the indicator that the phase discontinuity is used is transmitted before the first CRS transmission and the second CRS transmission are transmitted.

3. The method of claim 1, wherein the first CRS transmission and the second CRS transmission occur within a first frame.

4. The method of claim 1, wherein the phase discontinuity occurs between a first frame and a second frame.

5. The method of claim 1, wherein the phase discontinuity comprises a phase ramp up.

6. The method of claim 1, wherein the phase discontinuity comprises a cycle delay diversity (CDD) that varies a CRS phase in time or in frequency.

7. The method of claim 1, further comprising:
identifying a reference signal sequence period;
determining to use an extended CRS sequence period with respect to the identified reference signal sequence period; and
transmitting a CRS configuration associated with the extended CRS sequence period.

8. The method of claim 7, further comprising:
determining an extended CRS sequence boundary to use with respect to the extended CRS sequence period.

9. The method of claim 1, wherein the indicator that the phase discontinuity is used comprises an indication of a change from a continuous CRS phase mode to a discontinuous CRS phase mode.

10. An apparatus for wireless communication, comprising:
means for transmitting an indicator that a phase discontinuity is used between a first common reference signal (CRS) transmission and a second CRS transmission;
means for transmitting the first CRS transmission and the second CRS transmission with the phase discontinuity between the first CRS transmission and the second CRS transmission as indicated;
means for transmitting an indicator that a phase continuity is used between a third CRS transmission and a fourth CRS transmission, the indicator that the phase continuity is used indicating that the third CRS transmission and the fourth CRS transmission are coherently combinable; and
means for transmitting the third CRS transmission and the fourth CRS transmission with the phase continuity between the third CRS transmission and the fourth CRS transmission as indicated.

11. The apparatus of claim 10, wherein the means for transmitting the indicator that the phase discontinuity is used is operable to transmit before the first CRS transmission and the second CRS transmission are transmitted.

12. The apparatus of claim 10, wherein the first CRS transmission and the second CRS transmission occur within a first frame.

13. The apparatus of claim 10, wherein the phase discontinuity occurs between a first frame and a second frame.

14. The apparatus of claim 10, wherein the phase discontinuity comprises a phase ramp up.

15. The apparatus of claim 10, wherein the phase discontinuity comprises a cycle delay diversity (CDD) that varies a CRS phase in time or in frequency.

16. The apparatus of claim 10, further comprising:
means for identifying a reference signal sequence period;
means for determining to use an extended CRS sequence period with respect to the identified reference signal sequence period; and
means for transmitting a CRS configuration associated with the extended CRS sequence period.

17. The apparatus of claim 10, wherein the means for transmitting the indicator that the phase discontinuity is used comprises a means for indicating a change from a continuous CRS phase mode to a discontinuous CRS phase mode.

18. An apparatus for wireless communication, comprising:
a processor;
memory in electronic communication with the processor; and
instructions stored in the memory that are operable, when executed by the processor, to cause the apparatus to:
transmit an indicator that a phase discontinuity is used between a first common reference signal (CRS) transmission and a second CRS transmission;
transmit the first CRS transmission and the second CRS transmission with the phase discontinuity between the first CRS transmission and the second CRS transmission as indicated;
transmit an indicator that a phase continuity is used between a third CRS transmission and a fourth CRS transmission, the indicator that the phase continuity is used indicating that the third CRS transmission and the fourth CRS transmission are coherently combinable; and
transmit the third CRS transmission and the fourth CRS transmission with the phase continuity between the third CRS transmission and the fourth CRS transmission as indicated.

19. The apparatus of claim 18, wherein the instructions are executable by the processor to cause the apparatus to:
transmit the indicator that the phase discontinuity is used before the first CRS transmission and the second CRS transmission are transmitted.

20. The apparatus of claim 18, wherein the first CRS transmission and the second CRS transmission occur within a first frame.

21. The apparatus of claim 18, wherein the phase discontinuity occurs between a first frame and a second frame.

22. The apparatus of claim 18, wherein the phase discontinuity comprises a phase ramp up.

23. The apparatus of claim 18, wherein the phase discontinuity comprises a cycle delay diversity (CDD) that varies a CRS phase in time or in frequency.

24. The apparatus of claim 18, wherein the instructions are executable by the processor to cause the apparatus to:
identify a reference signal sequence period;
determine to use an extended CRS sequence period with respect to the identified reference signal sequence period; and
transmit a CRS configuration associated with the extended CRS sequence period.

25. The apparatus of claim 24, wherein the instructions are executable by the processor to cause the apparatus to:
determine an extended CRS sequence boundary to use with respect to the extended CRS sequence period.

26. The apparatus of claim 18, wherein the indicator that the phase discontinuity is used comprises an indication of a change from a continuous CRS phase mode to a discontinuous CRS phase mode.

27. A non-transitory computer-readable medium storing code for wireless communication, the code comprising instructions executable to:
- transmit an indicator that a phase discontinuity is used between a first common reference signal (CRS) transmission and a second CRS transmission;
- transmit the first CRS transmission and the second CRS transmission with the phase discontinuity between the first CRS transmission and the second CRS transmission as indicated;
- transmit an indicator that a phase continuity is used between a third CRS transmission and a fourth CRS transmission, the indicator that the phase continuity is used indicating that the third CRS transmission and the fourth CRS transmission are coherently combinable; and
- transmit the third CRS transmission and the fourth CRS transmission with the phase continuity between the third CRS transmission and the fourth CRS transmission as indicated.

\* \* \* \* \*